US012474034B1

(12) United States Patent
Rogers et al.

(10) Patent No.: US 12,474,034 B1
(45) Date of Patent: Nov. 18, 2025

(54) MOUNTABLE LIGHT HAVING AN ACCESS COVER AT A FORWARD END

(71) Applicant: Streamlight, Inc., Eagleville, PA (US)

(72) Inventors: Brandon J. Rogers, Honey Brook, PA (US); Mark W. Snyder, Hockessin, DE (US)

(73) Assignee: Streamlight, Inc., Eagleville, PA (US)

( * ) Notice: Subject to any disclaimer, the term of this patent is extended or adjusted under 35 U.S.C. 154(b) by 0 days.

(21) Appl. No.: 18/665,257

(22) Filed: May 15, 2024

(51) Int. Cl.

| | |
|---|---|
| ***F21V 23/04*** | (2006.01) |
| ***F21L 4/02*** | (2006.01) |
| ***F21S 9/02*** | (2006.01) |
| ***F21V 17/10*** | (2006.01) |
| ***F21V 17/18*** | (2006.01) |
| ***F21V 21/088*** | (2006.01) |
| ***F21V 23/00*** | (2015.01) |
| ***F41G 1/35*** | (2006.01) |
| ***F41G 1/36*** | (2006.01) |
| *F21Y 113/00* | (2016.01) |
| *F21Y 113/17* | (2016.01) |
| *F21Y 115/30* | (2016.01) |

(52) U.S. Cl.
CPC ................ *F21V 17/18* (2013.01); *F21S 9/02* (2013.01); *F21V 17/107* (2013.01); *F21V 21/088* (2013.01); *F21V 23/001* (2013.01); *F21V 23/004* (2013.01); *F21V 23/04* (2013.01); *F41G 1/35* (2013.01); *F41G 1/36* (2013.01); *F21Y 2113/17* (2016.08); *F21Y 2113/30* (2023.05); *F21Y 2115/30* (2016.08)

(58) Field of Classification Search
CPC ...... F21V 17/18; F21V 17/107; F21V 21/088; F21V 23/001; F21V 23/004; F21V 23/04; F21S 9/02; F41G 1/35; F41G 1/36
See application file for complete search history.

(56) References Cited

U.S. PATENT DOCUMENTS

| | | | |
|---|---|---|---|
| 3,084,248 | A | 4/1963 | Packer et al. |
| 5,410,457 | A | 4/1995 | Parker |
| 6,953,260 | B1 | 10/2005 | Allen |
| 7,188,978 | B2 | 3/2007 | Sharrah et al. |

(Continued)

OTHER PUBLICATIONS

Streamlight, Inc., "TLR-1 HL® Gun Light", printed Aug. 9, 2024, 2 pages, https://www.streamlight.com/en/products/detail/tlr-1-hl.

(Continued)

*Primary Examiner* — Tracie Y Green
(74) *Attorney, Agent, or Firm* — Clement A. Berard; Dann, Dorfman, Herrell and Skillman, P.C.

(57) ABSTRACT

A mountable light may comprise: a light body having a clamping arrangement and a compartment with an opening at an end thereof; a light head assembly including a source of light, the light head assembly being configured to cover the opening of the compartment; the light body and the light head assembly each having a feature that engages the feature of the other for pivoting the light head assembly relative to the light body, e.g., for covering and uncovering the opening of the compartment; and a latch for retaining the light head assembly against the light body to cover the opening of the compartment. A source of electrical power can be placed into and/or removed from the compartment of the light body when the mountable light is mounted to an object, e.g., a firearm or other object or device, by the clamping arrangement.

28 Claims, 14 Drawing Sheets

(56) References Cited

U.S. PATENT DOCUMENTS

| | | | |
|---|---|---|---|
| 7,466,082 | B1 | 12/2008 | Snyder et al. |
| 7,549,766 | B2 | 6/2009 | Sharrah et al. |
| 8,287,157 | B2 | 10/2012 | Sharrah et al. |
| D673,709 | S | 1/2013 | Sharrah |
| 8,371,729 | B2 | 2/2013 | Sharrah et al. |
| 8,727,561 | B2 | 5/2014 | Sharrah et al. |
| 8,779,683 | B2 | 7/2014 | Snyder et al. |
| 10,344,959 | B2 | 7/2019 | Worman et al. |
| D857,268 | S | 8/2019 | Worman |
| 10,612,761 | B1 | 4/2020 | Worman et al. |
| D898,260 | S | 10/2020 | Worman |
| D907,267 | S | 1/2021 | Worman |
| D907,268 | S | 1/2021 | Worman |
| 11,212,892 | B1 | 12/2021 | Boris |
| 11,506,366 | B2 | 11/2022 | Sharrah et al. |
| D997,413 | S | 8/2023 | Sharrah et al. |
| 2010/0176741 | A1 | 7/2010 | Sharrah et al. |
| 2017/0284646 | A1 | 10/2017 | Arena et al. |
| 2020/0173640 | A1 | 6/2020 | Worman et al. |
| 2020/0224836 | A1 | 7/2020 | McLennan |

OTHER PUBLICATIONS

Streamlight, Inc., “TLR-1® Gun Light”, printed Aug. 9, 2024, 2 pages, https://www.streamlight.com/en/products/detail/tlr-1.
Streamlight, Inc., “TLR-1® S Gun Light”, printed Aug. 9, 2024, 2 pages, https://www.streamlight.com/en/products/detail/tlr-1-s.
Streamlight, Inc., “TLR-1 HPL® Gun Light” printed Aug. 9, 2024, 2 pages, https://www.streamlight.com/en/products/detail/tlr-1-hpl.
Bayco Products Inc., “NightStick TCM-550XL Compact Tactical Weapon-Mounted Light”, ® 2019, https://www.baycoproducts.com/product/weapon-mounted-lights/item/tcm-550xl, date prior to Jul. 23, 2019 filing date, 5 pages.
International Searching Authority, “PCT—International Search Report & Written Opinion”, PCT/US2024/040498, mailed Sep. 24, 2024, 17 pages.

DRIVER ON SWITCH PCB uC BASED DRIVER ON HINGE PCB

*u*C BASED DRIVER ON HINGE PCB AND *u*C ON SWITCH PCB

*u*C BASED DRIVER ON HINGE PCB AND *u*C ON SWITCH PCB

MOUNTABLE LIGHT HAVING AN ACCESS COVER AT A FORWARD END

The present invention relates to a mountable light and, in particular, to a mountable light having an access cover at an end thereof. That cover can be opened and closed without removing the mountable light from an object or device to which it may be mounted.

Mountable lights, e.g., including lights mountable to firearms and other objects, of various types and kinds have been around for decades, and considerations that pertain to these mountable lights include safety and ease of mounting. Some mountable lights include an illumination light source, e.g., a white light source, and some include lasers, e.g., for providing a spot on a target to assist in aiming the object to which it is mounted, e.g., a firearm, when the aiming laser beam has been aligned with the object, e.g., firearm, itself. Some mountable lights have both illumination light sources and aiming lasers.

Some mountable lights have an access cover at the rearward end thereof, i.e. the end that is adjacent to the trigger guard when the light is mounted to a handgun. That configuration requires that the mountable light be removed from the firearm so that the access cover can be opened for replacing its batteries. This is considered inconvenient by some. In addition, when the mountable light includes a laser aiming light, removal and remounting of the mountable light can result in the laser aiming light becoming misaligned; and realigning the aiming laser to the firearm can require substantial time.

Size is an important consideration for mountable lights. Relatively smaller mountable lights are generally preferred over larger lights due to their lower weight and because their smaller size enables their being mounted closer to the body of the firearm. Having a smaller total package of the firearm and the mountable light mounted thereon is desirable because it is compatible with a smaller holster which is desirable for police and other security personnel, particularly when working undercover.

A countervailing consideration is that providing mountable lights having higher output power, e.g., brighter light or longer light range, typically results in the mountable light increasing in size, often because larger or plural batteries are needed.

One aspect of firearm safety is for a user to avoid placing himself in front of the muzzle of the firearm. This aspect can be addressed by either avoiding features that require such placement, e.g., of a hand, or by configuring the features to minimize such exposure. For example, lights that are mountable to the firearm from the side rather than being slipped onto a rail from forward of the muzzle, are desirable. Applicant's U.S. Pat. Nos. 7,188,978 and 8,371,729 relate to such mounting arrangements, and to those that can provide a snap-on, snap-off mounting action.

Also along that vein, some mountable lights have a threaded forward part that contains the light source and that can be unscrewed from the remainder of the mountable light, e.g., for replacing a battery therein, while the light remains mounted to an object, e.g., a firearm. U.S. Pat. No. 10,612,761 relates to a mountable light having a removable face cap at its forward end that is also usable for selecting operating modes for the light. That approach works for a mountable light having a single battery, but not for such lights that have plural batteries placed side-by-side.

Applicant believes there may be a need for a mountable light having an access cover therefor that is convenient to use and that, where the mountable light includes an aiming laser, replacing a battery doesn't affect the alignment of the aiming laser to the firearm. This is more needful where the mountable light utilizes plural batteries.

Accordingly, a mountable light may comprise: a light body having a clamping arrangement and having one or more actuators, and having a compartment for receiving a source of electrical power, the compartment having an opening at an end of the light body; a light head assembly including a source of light responsive to the one or more actuators, wherein the light head assembly is configured to cover the opening of the compartment of the light body; the light body and the light head assembly each having a feature that engages the feature of the other for pivoting the light head assembly relative to the light body; and a latch for retaining the light head assembly against the light body when the light head assembly is covering the opening of the compartment of the light body. The light head assembly is pivotable for covering and uncovering the opening of the compartment of the light body, whereby a source of electrical power can be placed into and/or removed from the compartment of the light body when the mountable light is mounted to an object by the clamping arrangement. The object can include a firearm.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include.

Figure 1A:
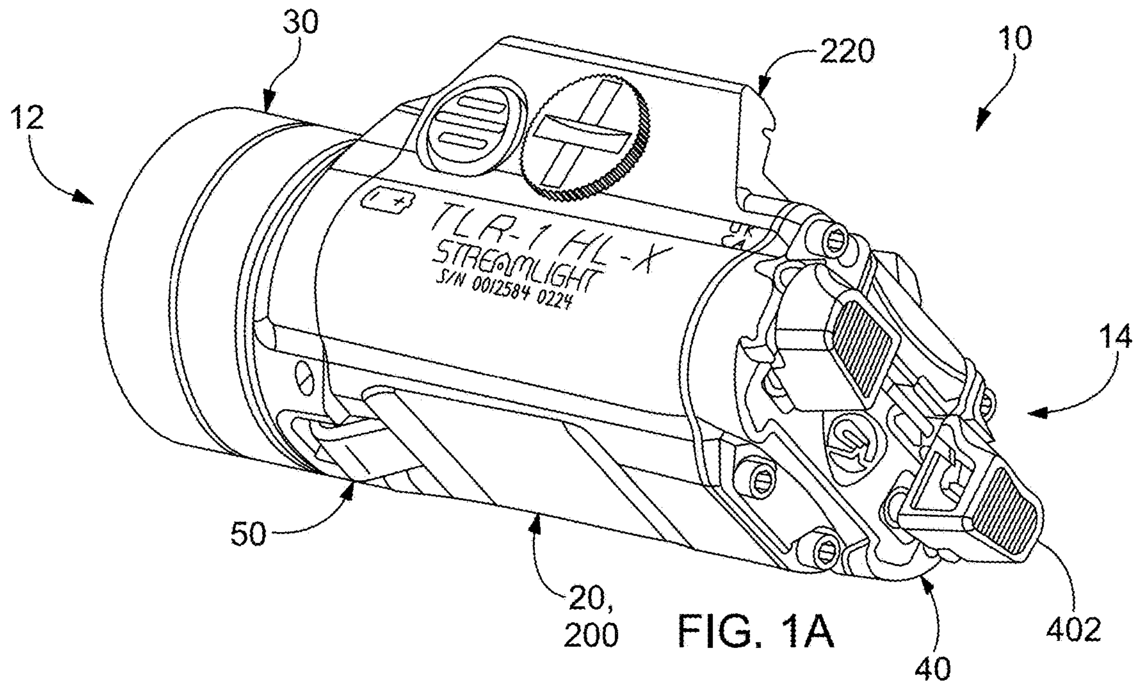
FIGS. 1A and 1B are perspective views of an example embodiment of an example mountable light in accordance with the present arrangement.

In the Drawing, where an element or feature is shown in more than one drawing figure, the same alphanumeric designation may be used to designate such element or feature in each figure, and where a closely related or modified element is shown in a figure, the same alphanumerical designation may be primed or otherwise modified to designate the modified element or feature. Similar elements or features may be designated by like alphanumeric designations in different figures of the Drawing and with similar nomenclature in the specification. As is common, the various features of the drawing are not to scale, the dimensions of the various features may be arbitrarily expanded or reduced for clarity, and any value stated in any Figure is by way of example only.

DESCRIPTION OF THE PREFERRED EMBODIMENT(S)

Figure 1B:
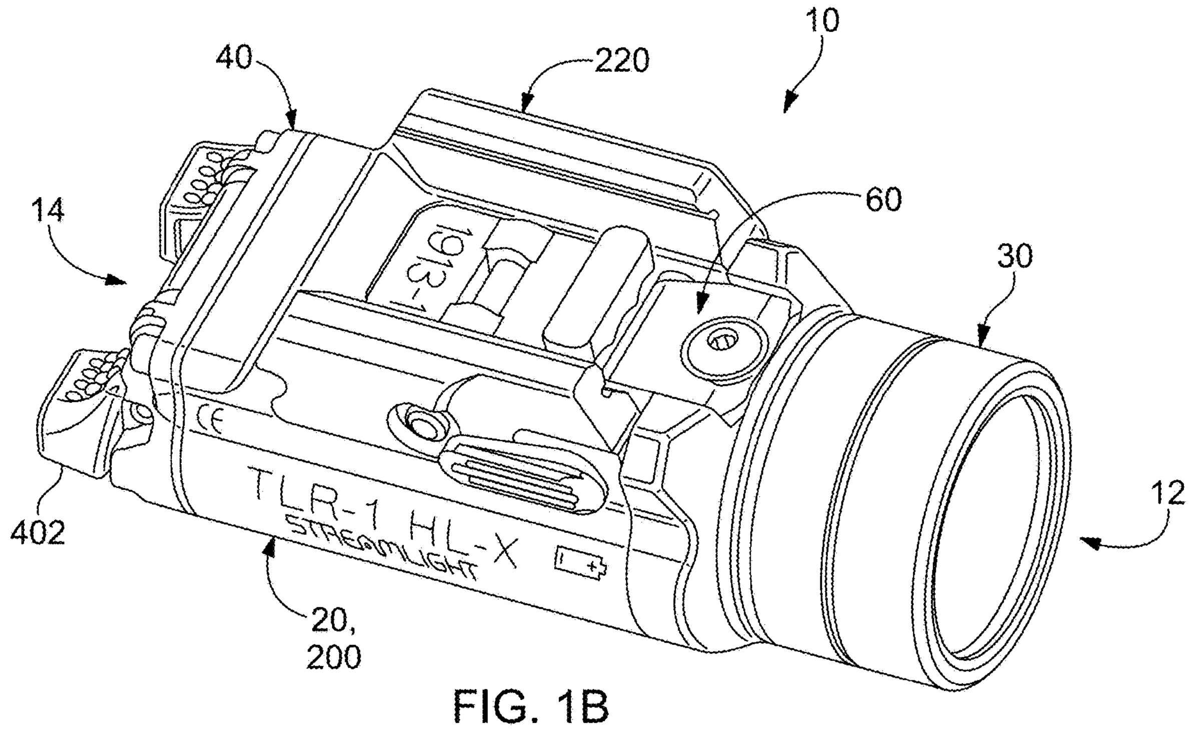

FIGS. 1A and 1B are perspective views of an example embodiment of an example mountable light 10 in accordance with the present arrangement; and FIGS. 2A through 2E include various orthogonal views of the example mountable light 10 of FIGS. 1A and 1B. Mountable light 10 includes light body 20 having a light head assembly 30 at a forward end 12 thereof, and having a rear cover or tail cap 40 at a rearward end 14 thereof. Light head assembly 30 also serves as an access cover 30 to a cavity or compartment of light body 20 wherein a replaceable power source is disposed so that such power source, e.g., a battery or batteries, can easily be replaced without removing the light 10 from the object, e.g., a firearm, to which it is mounted.

Light body 20 has a clamping arrangement 220 on a side thereof for interfacing with and attaching light 10 to a mounting rail or other attachment arrangement on an object, e.g., a firearm, to which mountable light 10 can be removably mounted. Fixed clamp member 202 on light body housing 200 cooperates with movable clamp member 222 to grasp onto a mounting rail when clamp screw 224 is tightened and to release the mounting rail when clamp screw 224 is loosened. A key 230, preferably a changeable key 230, and more preferably a changeable key 230 from a set of changeable keys 230 that are configured for enabling light 10 to be mounted to different objects, e.g., to different firearms and/or firearm rails. While many different kinds of mounting arrangements 220 may be employed with light 10, U.S. Pat. Nos. 7,188,978 and 8,371,729 relate to example suitable mounting arrangements of a sort that can provide a snap-on, snap-off mounting action from the side of the object.

Light head assembly 30 includes a housing 300 that includes a light source therein that emits light from its forward end 12 for providing illumination in a direction 12 forward of light 10. Light head assembly 30 also serves as an access cover 30 that is openable for accessing a compartment 204 in light body 200 that is configured to receive a source of electrical power, e.g., a battery or batteries therein. Access cover 30 is pivotably connected to light housing 200 by a pivot 50 or hinge 50 that allows access cover 30 to pivot away from housing 200 for providing access to the compartment 204, e.g., for removing a power source therefrom and/or for replacing such power source with another power source therein, and to pivot towards housing 200 to be adjacent thereto to cover the opening into compartment 204 therein.

Latch 60 retains access cover 30 in a closed position adjacent to the forward end of housing 200 thereby to cover compartment 204. Latch release 260 thereof either grasps or releases latch clip 268 thereby to retain access cover 30 adjacent to light body 200 or to release access cover 30 to be pivoted away therefrom. Latch release 260 is, e.g., operated by moving lever 262 in a clockwise direction to release the latch 60 and in a counter clockwise direction to latch the latch 60. A non-symmetric shaft 264 to which lever 262 is attached serves as a pawl for engaging the distal end of clip 268 for pulling access cover 30 closer to light body 20 for providing a better seal therebetween.

Tail cap 40 which serves as a rear cover 40 covers the rearward end 14 of light housing 200 and provides one or more actuators 402 that are operative, by being pressed towards housing 300 to actuate electrical switches therein for actuating and controlling the electrical circuitry of light 10 that controls operation of the light source of light head assembly 30 to produce light and to not produce light (i.e. ON and OFF), to vary the brightness of the light produced, e.g., dimming, and/or to intermittently produce light, e.g., in a blinking or strobing operation.

For the purposes of description herein, light 10 is deemed to define a longitudinal direction between its forward end 12 and its rearward end 14; and a longitudinal axis may be considered to pass in the longitudinal direction through the center of light source 310 of cylindrical part 305 of light head 30. Light 10 generally projects light forwardly along the longitudinal direction from light head assembly 30. Directions that cross the longitudinal direction or axis are referred to as being transverse to the longitudinal direction or simply as transverse or transversely.

Advantages of the novel arrangement for a light described herein include, e.g., that a user can replace the source of electrical power, e.g., one or more batteries, while the light remains mounted on an object, e.g., a firearm, probably most commonly a handgun, which is a valuable convenience and safety feature for many users. Further, the present arrangement facilitates mountable lights being configured to be shorter in length, e.g., along the barrel of a weapon, as well as generally being more compact even when it is desired that the light employ plural batteries which are necessary to provide brighter illumination and/or longer operating time (run time) on a battery or a set of batteries.

Figure 3A:
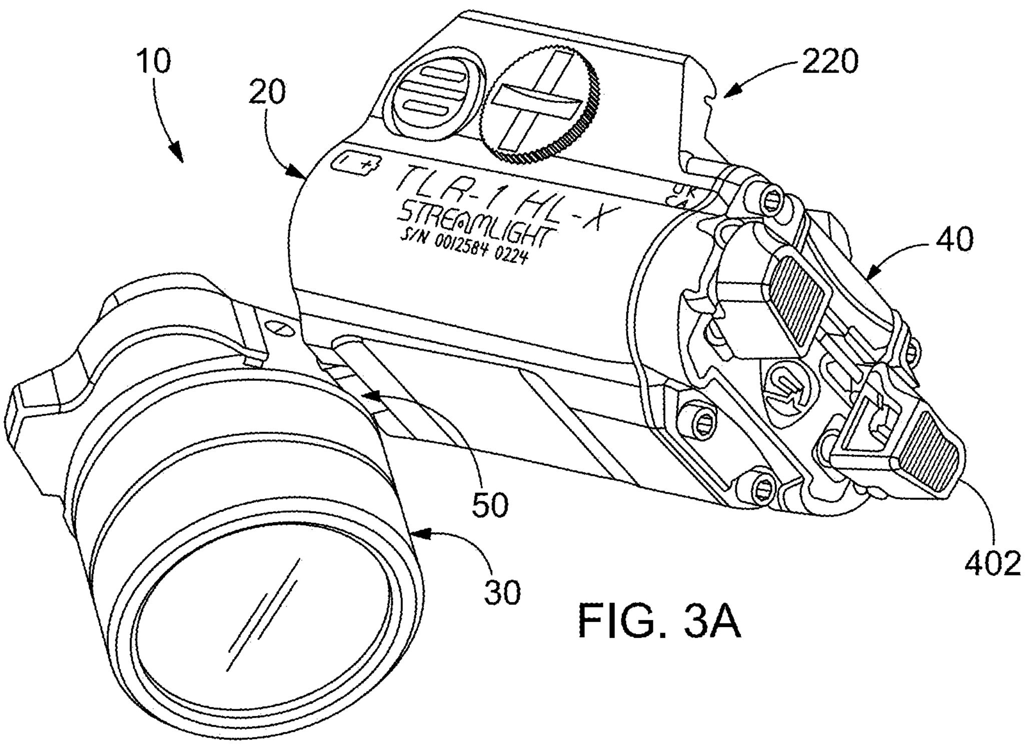
FIGS. 3A and 3B are perspective views of the example mountable light with an access cover at an end thereof in an open position.
Figure 3B:
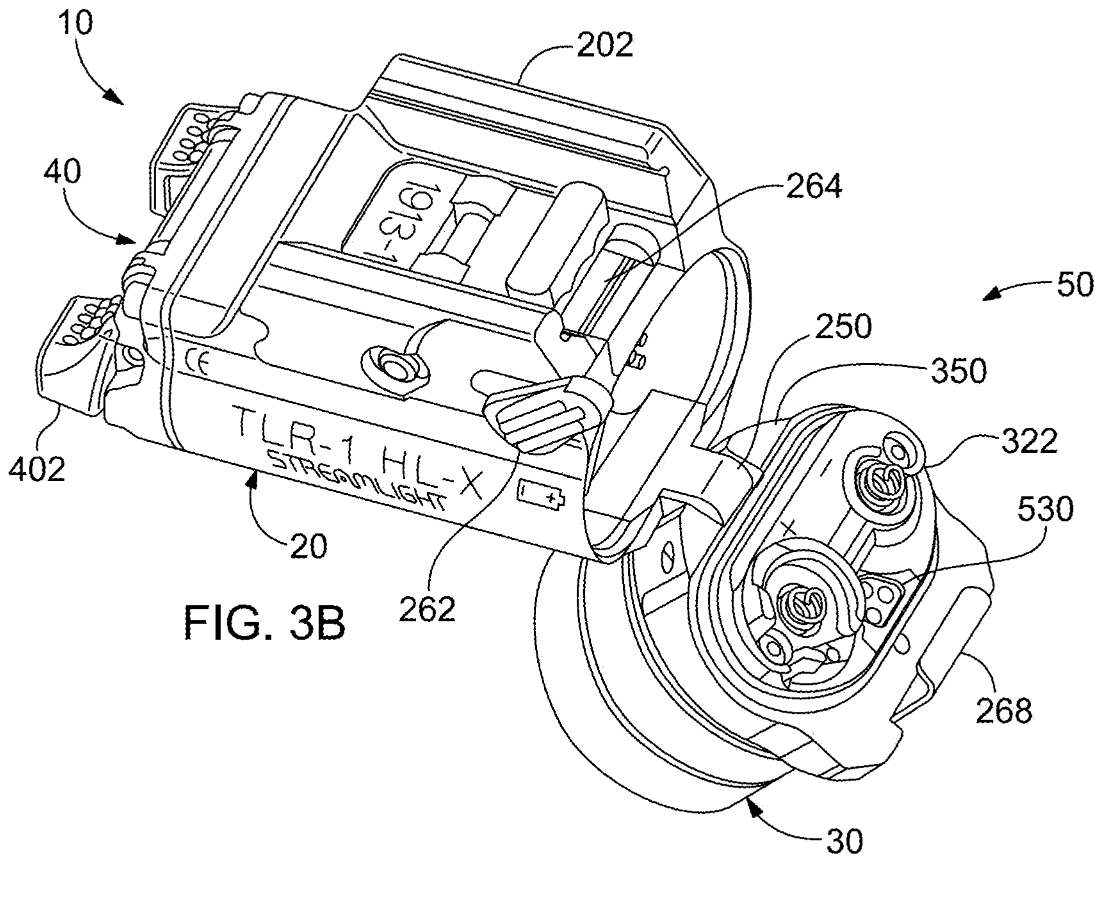
Figure 4A:
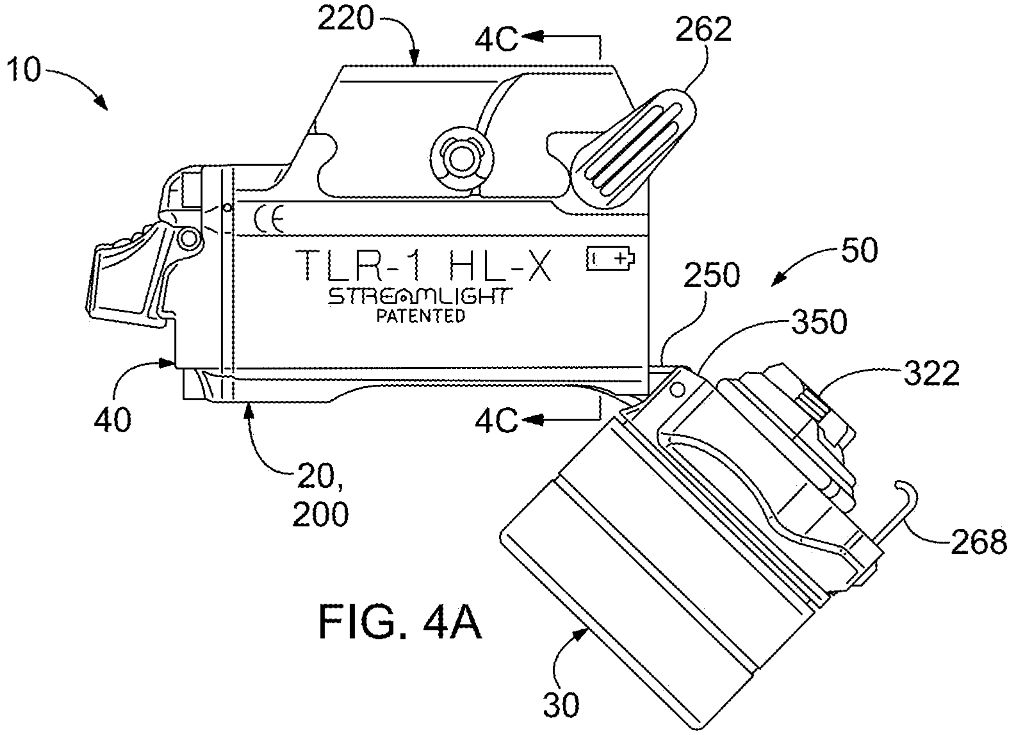
FIGS. 4A through 4C are side views and an end view of the example mountable light with the access cover at the end thereof in the open position.
Figure 4B:
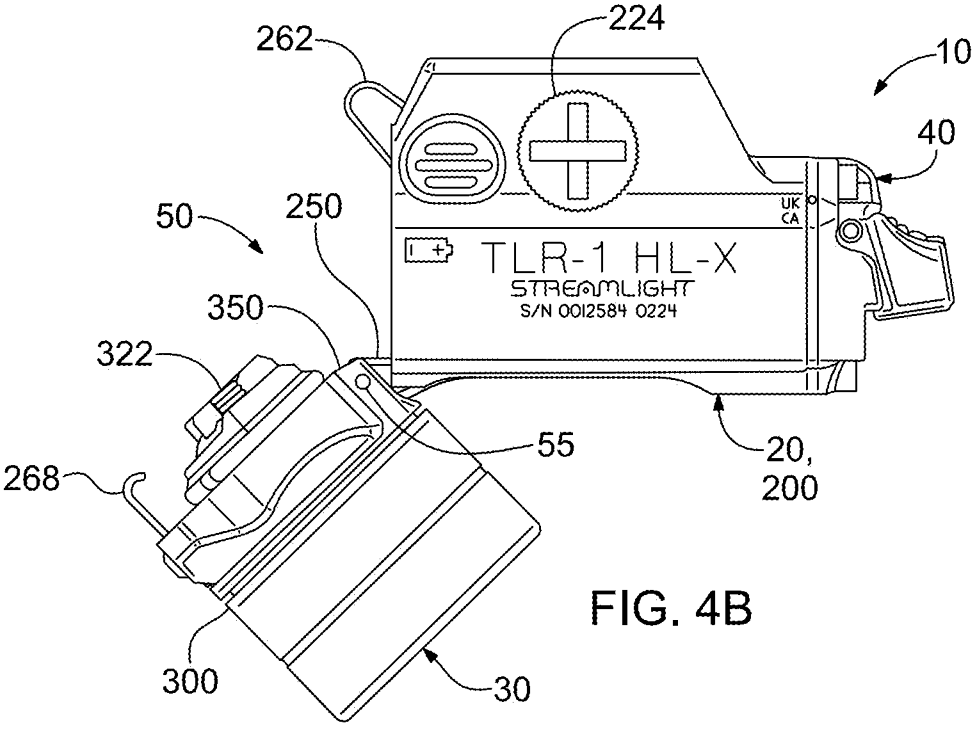
Figure 4C:
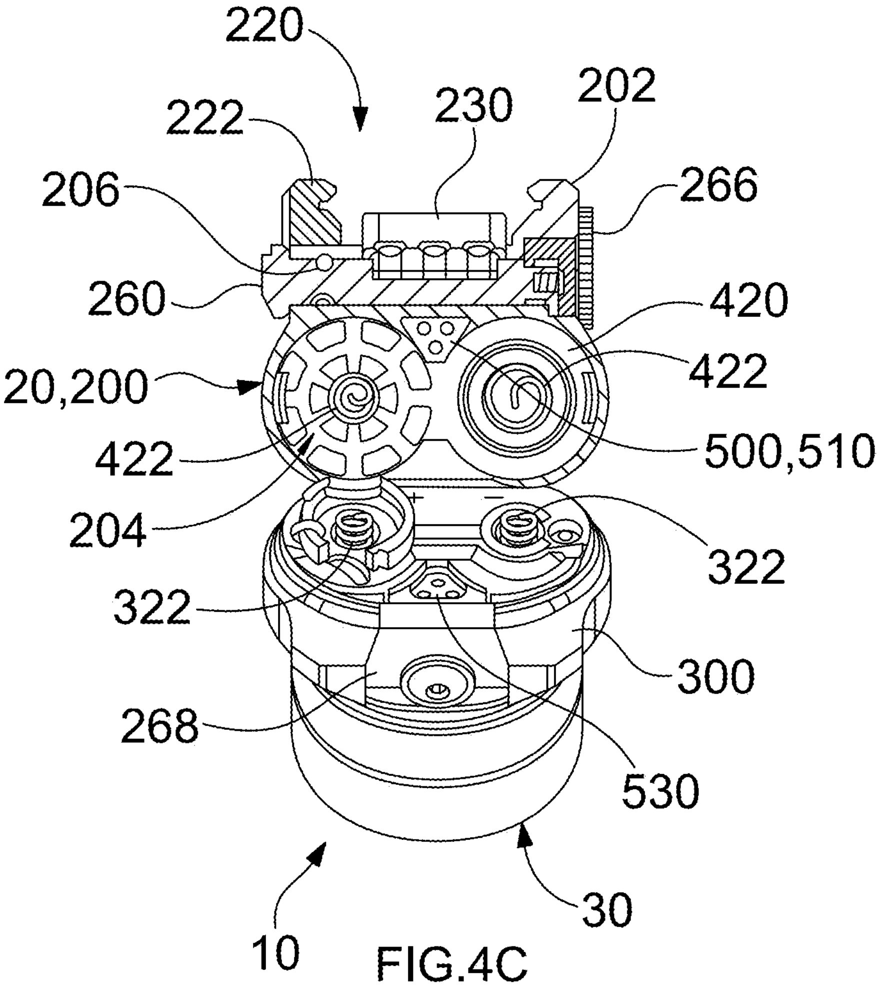
Figure 5:
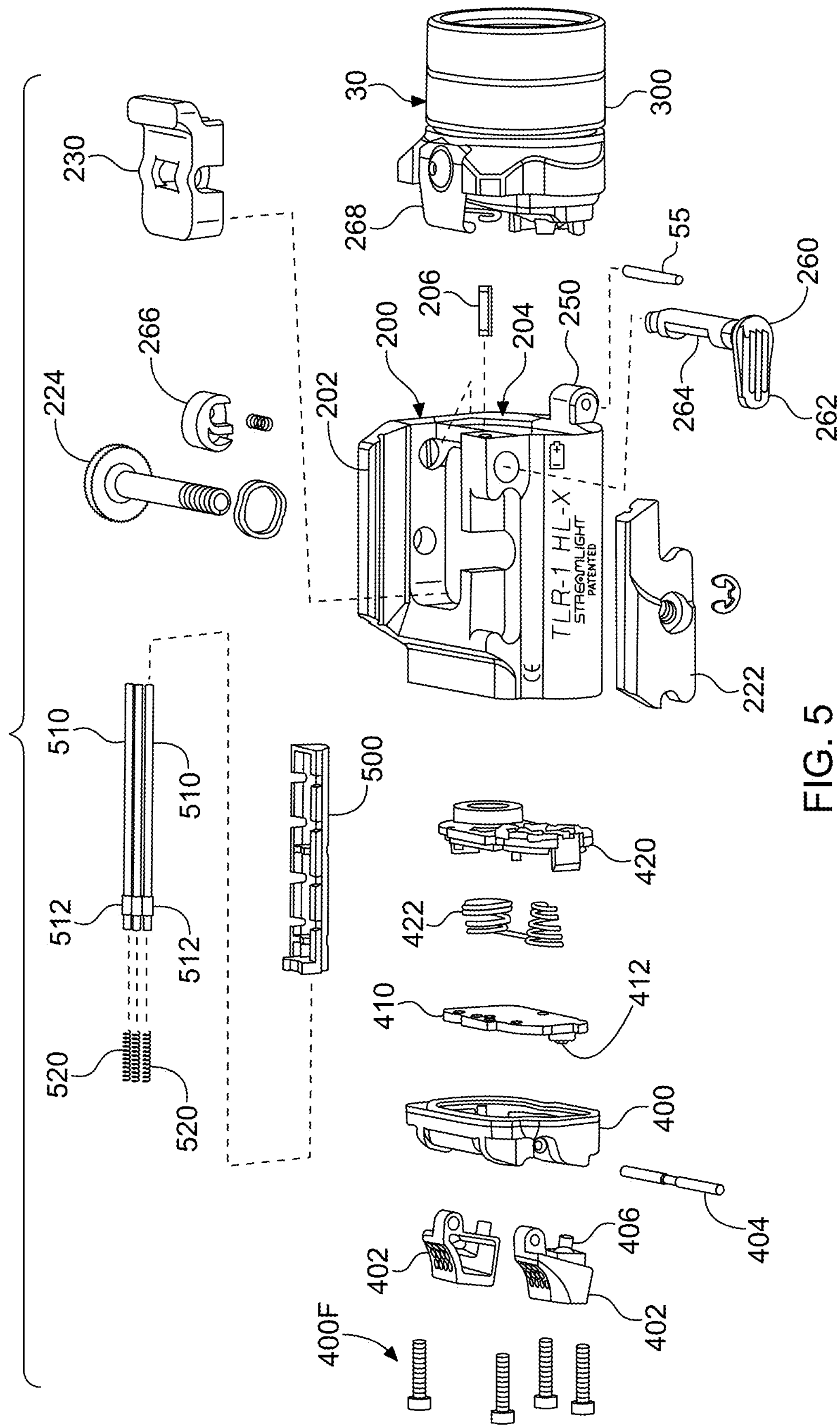
FIG. 5 is an exploded view of the example light of the foregoing Figures.
Figure 6:
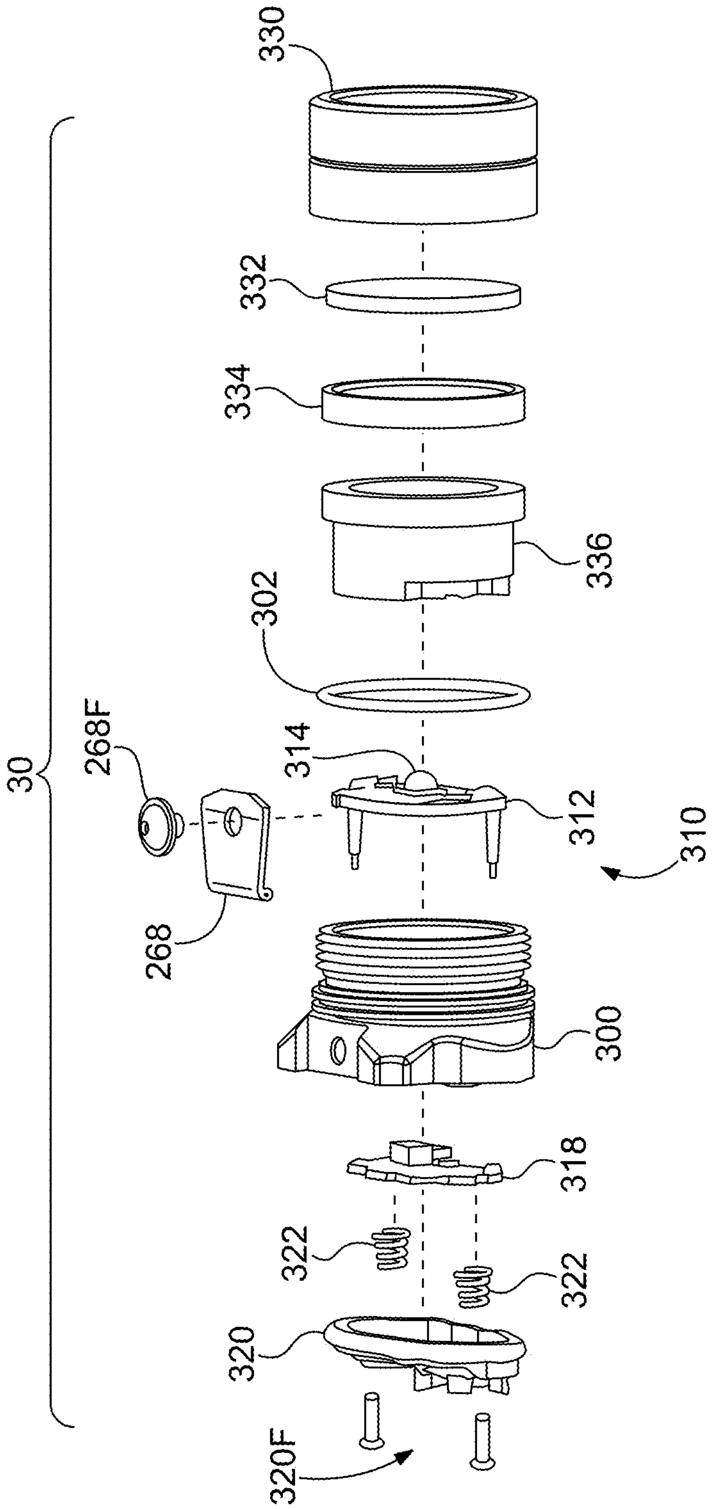
FIG. 6 is an exploded view of an example light head or access cover of the example light of the foregoing Figures.

FIGS. 3A and 3B are perspective views of the example mountable light 10 with an access cover 30 at an end 12 thereof in an open position; FIGS. 4A through 4C are side views and an end view of the example mountable light 10 with the access cover 30 at the end 12 thereof in the open position; FIG. 5 is an exploded view of the example light 10 of the foregoing Figures; and FIG. 6 is an exploded view of an example light head 30 or access cover 30 of the example light of the foregoing Figures. Because the side of light 10 that includes the mounting arrangement 220 is adjacent to an object, e.g., a firearm, when light 20 is mounted thereto, pivot 50 or hinge 50 is preferably disposed on an opposite side of light 10, as illustrated. However, pivot 50 or hinge 50 could be located otherwise if desired, so long as the opening of access cover 30 would not be precluded thereby by the object to which light 10 may be mounted.

There are both mechanical aspects and electrical aspects associated with the interface and functioning of the access cover 30 described herein in relation to the remainder of light 10, e.g., light body 20 and rear cover/tail cap 40, and those aspects will be described below in that order. The mechanical aspects mostly relate to physically opening and closing access cover 30 in relation to light body 20, and to retaining it in a closed position on light body 20. The electrical aspects arise because access cover 30 is also the light head assembly 30 of light 10 which includes a light source 310, e.g., an LED light source, lenses and/or optical elements for forming light into a light beam and directing it in a desired direction, and electrical connections with the light body 20 which includes one or more sources of electrical power, e.g., batteries, and controls for light 10, e.g., actuators 402 and electrical circuitry relating thereto.

An example pivot 50 or hinge 50 includes complementary pivot 50 elements on body 20, 200 and on access cover 30, 300. Pivot 50 can include one or more pivot features 250 on body/housing 20, 200 that engage with one or more complementary pivot features 350 on access cover 30, 300 when access cover 30 is adjacent to body/housing 20, 200. Examples of pivot features 250, 350 include, e.g., engagable projections and recesses, engagable hooks and loops, engagable projections and slots, hinges and the like. It is not believed necessary that the engagable pivot features 250, 350 remain engaged when access cover 30 is open to provide access to the compartment of light 10 in which the one or more power sources are disposed.

One example of a suitable pivot 50 includes one or more hinge knuckles on body 20, 200 and one or more complementary knuckles on access cover 30, 300. For example, one or more hinge knuckles 250 can be provided on light body housing 200 and one or more hinge knuckles 350 complementary thereto can be provided on housing 300 of light head assembly 30 or access cover 30. For stability and durability, it is preferred that at least two hinge knuckles be provided on one of light housing 200 or access cover housing 300. Hinge pin 55 is disposed through respective coaxial openings in hinge knuckles 250, 350 to allow access cover 30 to pivot thereon relative to light body 20, 200.

Latch 60 is provided to latch, i.e. to retain, access cover 30 in a closed position adjacent to the forward end of light body housing 20, 200, thereby to cover and close the compartment 204 in which one or more power sources can be disposed. A variety of different kinds of latches 60 may be employed, e.g., a clip or loop on one of the body 20, 200 and access cover 30, 300 that engages a projection or other feature of the other of the body 20, 200 and access cover 30. Many different latching arrangement 60 that engage with sufficient holding power to retain cover 30, 300 in the closed position against body housing 20, 200 in normal use, e.g., including the firing of a firearm to which mountable light 10 is mounted, can be suitable.

In the illustrated preferred example, latch 60 includes a latch clip 268 and a latch release 260 arrangement. Latch clip 268 is part of access cover 30, e.g., clip 268 is preferably a metal part and is attached to housing 300 of access cover 30 by a fastener 268F as illustrated. Clip 268 extends rearward in a direction toward light body 20, 200 for engaging therewith. Latch release arrangement 260 is part of light body 200, e.g., latch release 260 is supported by housing 200. Latch release 260 includes a shaft 264 that has a flattened or recessed side and a release lever 262 extending radially from an end of shaft 268. Shaft 268 is disposed transversely to light body 20 and is rotatable in a bore in housing 200 thereof by moving lever 262. Release lever 262 and shaft 264 are essentially one piece and so they are movable together, e.g., in both clockwise and counterclockwise directions.

Moving release lever 262 clockwise rotates the flattened side of shaft 264 clockwise to a position whereat clip 268 and shaft 264 become disengaged; and rotating lever 262 counter clockwise rotates the flattened side of shaft 264 counter clockwise to a position whereat shaft 264 and latch clip 268 will engage when access cover 30 is adjacent to light body 20 thereby to retain or latch access cover 30 in the closed position. In the example illustrated, the bent tip of clip 268 and the flattened side of shaft 264 engage and disengage. Latch release 266, e.g., button 266, must be pressed before latch lever 262 can be rotated clockwise, and release button 266 snaps back to a locked position when lever 262 is rotated counterclockwise to grasp clip 268 and latch access cover 30 in its closed position.

Figure 2A:
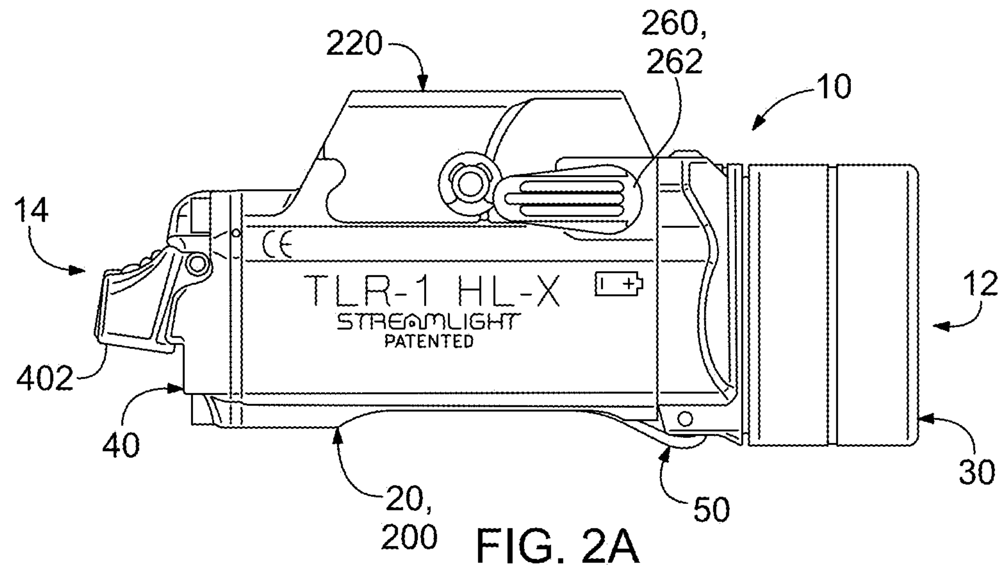
FIGS. 2A through 2E include various orthogonal views of the example mountable light of FIGS. 1A and 1B.
Figure 2B:
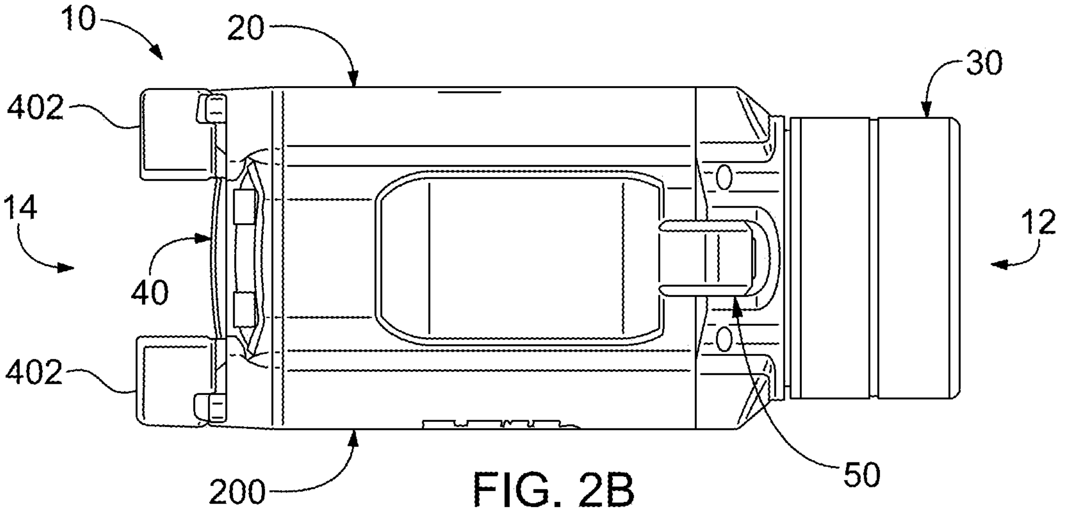
Figure 2C:
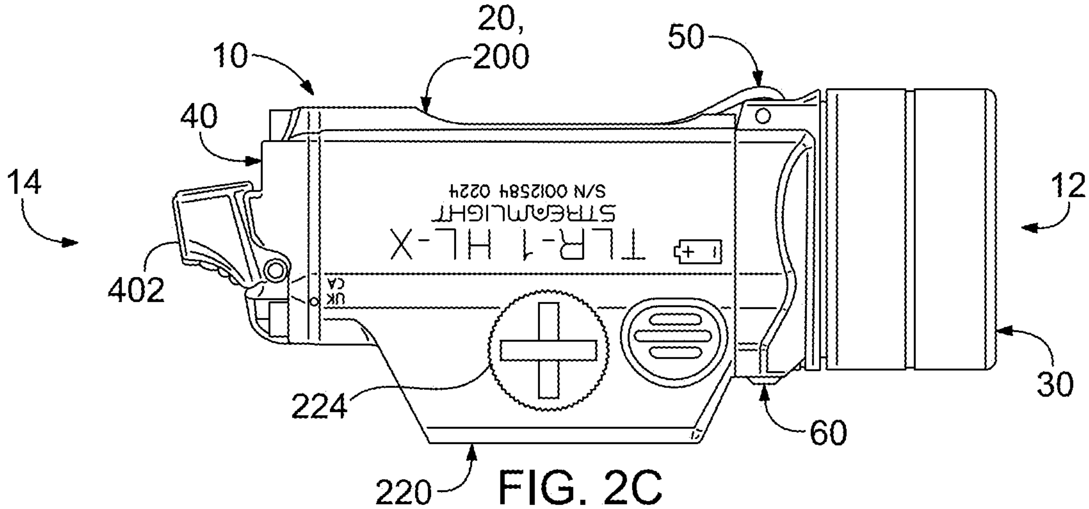
Figure 2D:
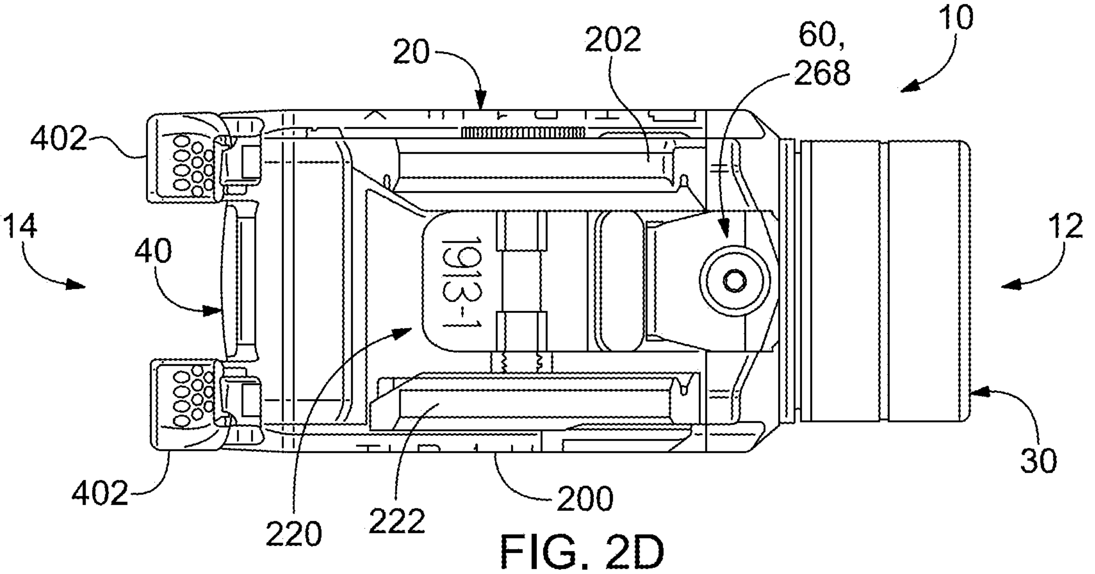
Figure 2E:
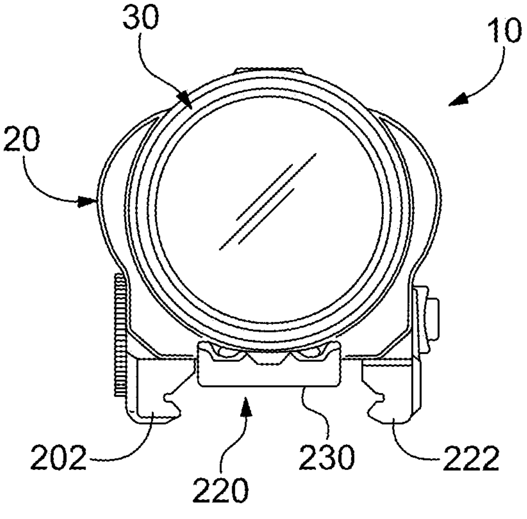

Release lever 262 is shown in a latch-engaging position, e.g., in FIGS. 1B and 2A, and is shown in a latch disengaging position in FIGS. 3B and 4A. Latch 260 is retained in light body 200, e.g., by a pin 206 inserted into housing 200, and the distal end of shaft 264 engages latch release button 266 which engages the bore in which shaft 264 and button 266 are disposed; button 266 also serves as a cover 266 at the end of shaft 264.

One advantage of the described latch 260 with a lever 262 is that a better seal between light body 20, 200 and access cover 30, 300 can be obtained. To this end, lever 262 and clip 268 can be configured such that lever 262 when moved from the unlatched to the latched position grasps clip 268 and pulls it close to body 20, 200, thereby to provide a tighter seal therebetween which, e.g., better resists the intrusion of moisture, water and debris into the interior of light 10.

Electrically, access cover 30 provides electrical contacts that connect with the terminals at the forward ends of the power sources that are disposed in compartment 204 of light body 20 and must also provide electrical connections between the light source 310 in light head assembly 30, 300 and the actuators, switches and electrical circuits disposed in light body 20 and/or in rear cover 40.

Spring contacts 422 are disposed at the rearward end of compartment 204 (the end far from the opening at the forward end of compartment 204) for providing electrical connections to power sources disposed in compartment 204, and spring contacts 322 are disposed at the rearward end of access cover 30 for providing electrical connections to the other ends of the power sources disposed in compartment 204 when access cover 30 is in the closed position.

Preferably, both the rearward end of compartment 204 and the rearward end of access cover 30 are configured to make electrical connection to the power sources disposed in compartment 204 only when the power sources are inserted with the proper polarity, e.g., in the proper direction. Examples of such power sources include, e.g., those having different forms of terminals at their opposite ends, including typical batteries of the AA, AAA and CR-123 configurations which have a flat circular terminal at one end and a raised smaller nub contact at the other end. These features of compartment 204 and its contacts 422 and of access cover 30 and its contacts 322 are evident in FIG. 4C as well as in other Figures.

Electrical connections between switches and other electrical circuitry in or near rear cover 40 and electrical circuitry and the light source in openable light head assembly (access cover) 30 presents a more complex challenge. Many common sources of electrical power are configured in cylindrical packages, e.g., AA and AAA batteries, CR-123 batteries and the like, which when placed side-by-side in an oval compartment have an elongated empty space with a triangular-like cross section along their length. Carrier 500, also referred to as carrier housing 500, is configured to be disposed in that elongated space, and is best seen, e.g., in FIGS. 4C and 5.

Carrier 500 of one or more electrical conductors 510, or housing 500 or carrier housing 500, is configured to be disposed in compartment 204 of housing 200 in the elongated triangular space not occupied by the batteries or other power sources that may be disposed therein. Example carrier 500 is elongated having a base with two side walls along its length and having two triangle-like ends. Triangular is here used loosely as two adjacent elongated sides of carrier 500 are concave so that it can be disposed more closely to side-by-side cylindrical power sources; the third "side" may be open and is preferably disposed adjacent to a wall of compartment 204.

Carrier 500 is preferably made of electrically insulating material and attaches to the wall of compartment 204, e.g., by edges or features of its side and/or end walls. The opposing ends of carrier 500 have respective openings, e.g., three openings each in the present example embodiment, through which the opposing ends of the electrical conductors 510, e.g., three electrical conductors 510, extend. The three openings at the end of carrier 500 are preferably in a triangular configuration so that the ends of conductors 510 extending therefrom are in a like configuration.

Various forms of the one or more electrical conductors 510 may be employed. Each electrical conductor 510 in the illustrated example embodiment is preferably relatively rigid, e.g., like a long pin, and has an enlarged feature 512, e.g., a shoulder or collar 512, to provide a bearing surface against which a biasing spring 520, e.g., a one of three springs 520, bear for urging a respective electrical conductor 510 toward the forward end of carrier 500 which is at the opening to compartment 204, whereby the forward ends of electrical conductors 510 are biased towards access cover 30 for making electrical connection therewith, e.g., with contacts 530 thereof. The electrical conductors 510 can include, e.g.: one or more wires, one or more formed wires, one or more conductive pins, one or more spring-loaded pins, one or more plungers with springs, a cable, a flexible cable, a ribbon cable, an electrical circuit board, or a combination thereof.

Example electrical contacts 530 of access cover 30 are disposed thereon in a position whereat the electrical contacts thereof will align with the ends of electrical conductors 510 that extend from the end of carrier 500 when access door 30 is in the closed position relative to light body 20. Contacts 530 of access cover 30 are in a configuration that matches the configuration of the ends of electrical conductors 510 expending from carrier 500, e.g., here three conductors in a triangular configuration, thereby to consistently align therewith for making suitable electrical connections between light body 20 and access cover/light head 30.

Example rear cover 40, also referred to as a tail cap 40, comprises a rear cover housing 400 and a housing cover 420 that are held together, e.g., by a fastener, a snap or the like of one of parts 400, 420, to enclose electrical circuit board 410 and rear battery springs 422 in their respective positions therein. Rear cover 400 is attached to light body 200, e.g., by one or more fasteners 400F, such as screws 400F, whereby housing cover 420 thereof provides the end (bottom) inside compartment 402. One or more actuators 402, in this example two actuators 402, are pivotably attached to the housing 400 of rear cover 40 by an actuator pin 404 that passes through respective openings in actuators 402 and housing 400. Each actuator 402 has a projection 406 that extends through an opening and/or acts through a flexible feature or membrane of housing 400 to engage and actuate a respective electrical switch 412 on circuit board 410 for actuating light 10 and the light source thereof contained in light head assembly 30.

While the illustrated example embodiment is configured to receive two sources of electrical power, e.g., two batteries, side-by-side in compartment 204 of housing 200, the present arrangement may be configured for being employed with other sources of electrical power and with sources of electrical power that are in different configurations. For example, compartment 204 may be configured to receive one or more power sources physically in line with each other, or in other configurations wherein the electrical power sources in compartment 204 may be disposed in various combinations of side-by-side and/or in-line configurations.

The example clamp arrangement 220 comprises a fixed clamp member 202 that is part of housing 200 and a movable clamp member 222 that is moved closer to and further from fixed clamp member 202 by rotating clamp screw 224. Clamp arrangement 220 may include a wavy spring or other biasing member that preferably biases movable clamp member 222 to move towards clamp member 202 and/or an E-clip or other retainer that prevents clamp screw 224 from being unintentionally removed from light 10. One example of a suitable clamping arrangement is found in Applicant's U.S. Pat. No. 8,371,729 entitled "Light with Keying Arrangement Mountable on a Mounting Rail," which is hereby incorporated herein by reference in its entirety.

As best seen in FIG. 6, light head 30/access cover 30 is an assembly that includes a main light head housing 300 which has a forward end onto which face cap or lens ring 330 is attached, e.g., by the engaging of threads, e.g., external threads, of housing 300 and of threads, e.g., internal threads, of lens ring/face cap 330. The assembly of lens ring/face cap 330 to light head housing 300 encloses and retains lens 332, reflector 336, and light source 310 therein whereby light produced by light source 310 is formed into a beam by reflector 336 and emitted through lens 332 in a generally forward direction from light 10. Light source 310 includes an electrical circuit board 312 for supporting the source of light 314, e.g., light emitting diode 314, thereon. O-ring 302 provides a seal between light head housing 300 and reflector 336 and scaling ring 334 provides a seal between lens ring 330, lens 332 and reflector 336, to reduce entry of moisture, water and/or debris therein. Housing 300 is preferably of a thermally conductive material, e.g., aluminum, a plastic filled with thermally conductive particles, and the like. Reflector 336 preferably has a shaped curved interior surface, e.g., a parabola like surface, that is polished to be highly reflective; alternatively, reflector 336 may include a solid optical element that is shaped to provide a beam forming function.

Rear cover 320 of light head 30 provides support for battery contacts 322, e.g., helical spring contacts 322, which extend into compartment 204 of light housing 20, 200 for making electrical connection to the terminals of the one or more sources of electrical power when such sources are disposed therein. Rear cover 320, or retainer 330, also supports and retains an electrical/electronic circuit board 318 which includes electrical and/or electronic circuitry that is responsive to actuation of actuators 402 of rear cover 40 for causing LED light source 310 to become connected to and become disconnected from the source of electrical power in compartment 204 when light head/access cover 30 is closed and latched to light body 20, 200. Rear cover and retainer, 320 is attached to housing 300 by one or more fasteners 320F to retain circuit board 318 and spring contacts 322 in their respective positions in relation thereto.

In a preferred embodiment, circuit board 318 of light head 30 includes electronic circuitry that controls the operation of light source 310. Therein, the electronic circuitry of circuit board 318 responds to actuation of either or both actuators 402 to control the application of electrical power to light source 310 in a way that provides ON/OFF control as well as control of and/or selection of other operating modes, e.g., selecting a light source, dimming and un-dimming, flashing, strobing, and the like. The circuitry of circuit board 318 typically includes a processor 319, e.g., a microprocessor or a microcontroller 319, that receives signals from the electrical switches associated with actuators 402 via one or more conductors 500, 510 and includes circuits that convert electrical power from the power source(s) in compartment 204 into voltages and currents that operate light source 310 in the desired operating mode, responsive to the processor 319 which thus serves as a driver circuit 319 for the light source 310.

In an alternative embodiment, the control circuitry 319, 418, may be disposed in another location in light 10, e.g., on the circuit board 410 of tail cap/rear cover 40 as previously described. In either instance, electrical connections between circuit board 318 and circuit board 410 is provided via the one or more electrical conductors 510 disposed in electrical carrier 500, the respective ends of which make electrical contact with respective electrical contacts of circuit board 318 of the light head/access cover 30 and of circuit board 410 of the tail cap/rear cover 40.

Figure 7:
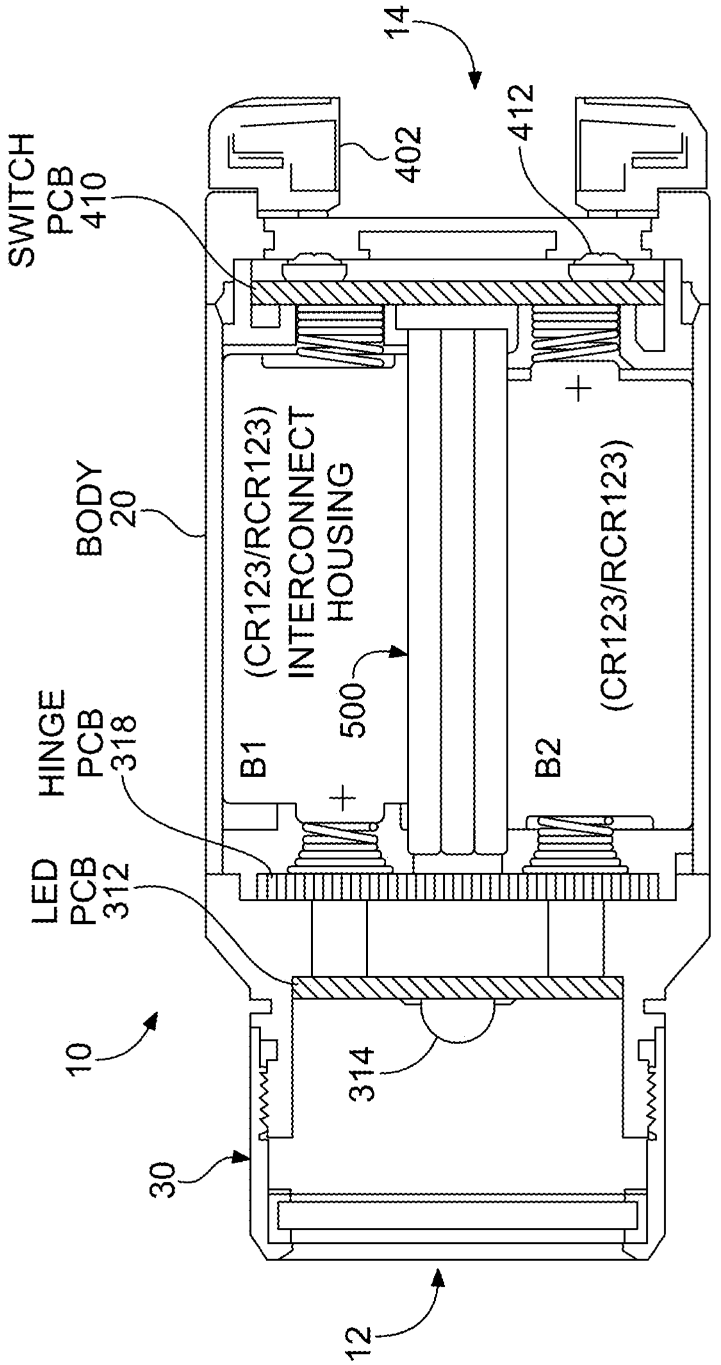
FIG. 7 is a cross-sectional diagram for illustrating various arrangements internal to the example embodiment of the light of the foregoing Figures.

FIG. 7 is a cross-sectional diagram for illustrating various arrangements internal to the example embodiment of light 10 of the foregoing Figures; and FIGS. 8A through 8E are schematic diagrams illustrating examples of alternative electrical configurations of the example light 10 of the foregoing Figures. Therein, electrical conductors that conduct relatively higher current are depicted by a heavier line and those conducting relatively lower current are indicated by a thinner or intermittent line.

FIG. 7 illustrates example dispositions for circuit boards of light 10 and their placements therein, e.g., in access cover 30/light head assembly 30 and in tail cap assembly 40. Example connection assembly 500, also referred to as carrier 500, therein includes a housing 500 in which one or more electrical conductors 510 are disposed for providing electrical connections between access cover/light head assembly 30 and tail cap 40. It is noted that a suitable number of electrical conductors 510 may be provided in a manner not requiring a housing or carrier 500, e.g., using a ribbon or other cable or a circuit board that may be either rigid or flexible.

Figure 8A:
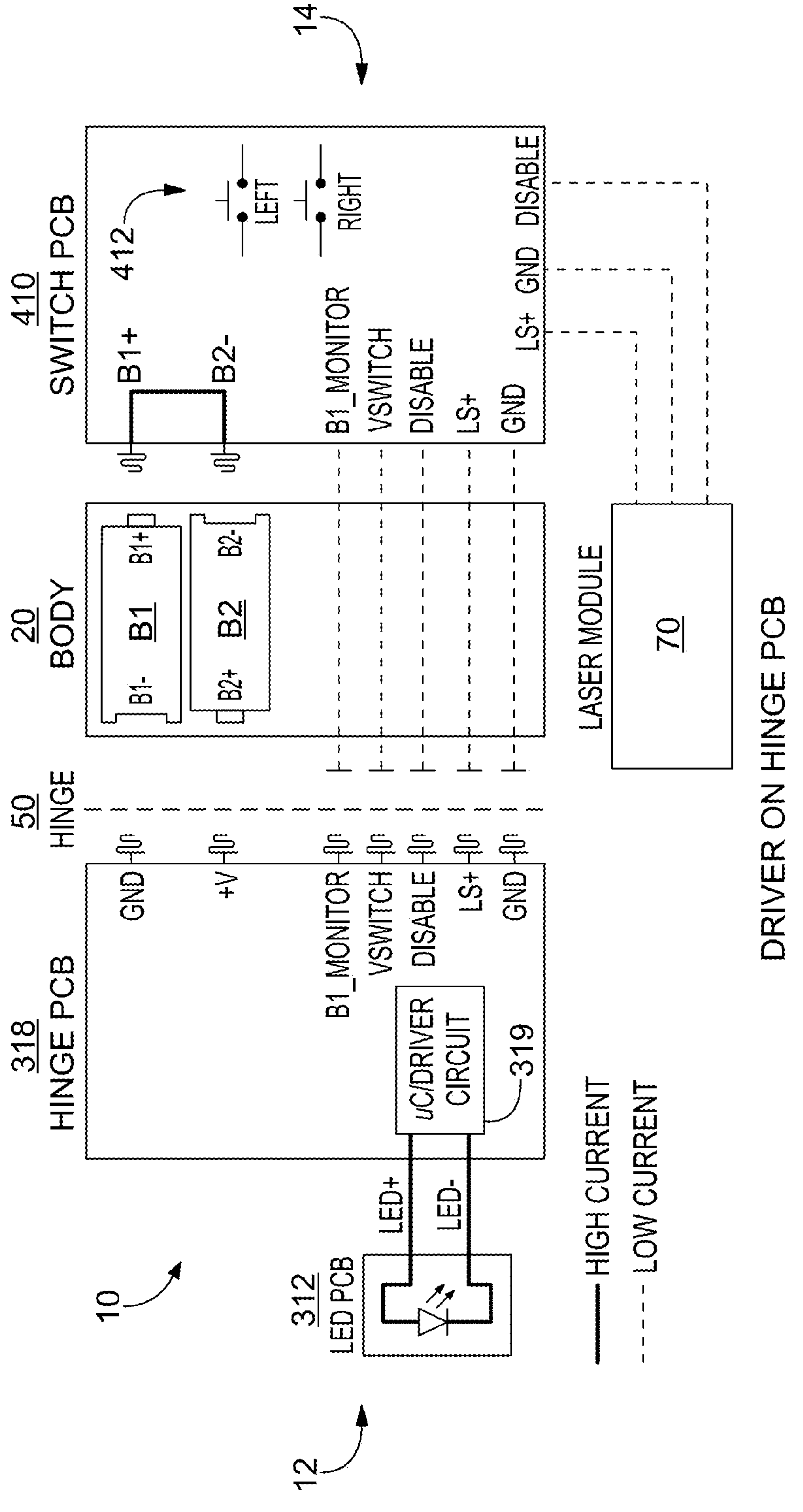
FIGS. 8A through 8E are schematic diagrams illustrating examples of alternative electrical configurations of the example light of the foregoing Figures.
Figure 8B:
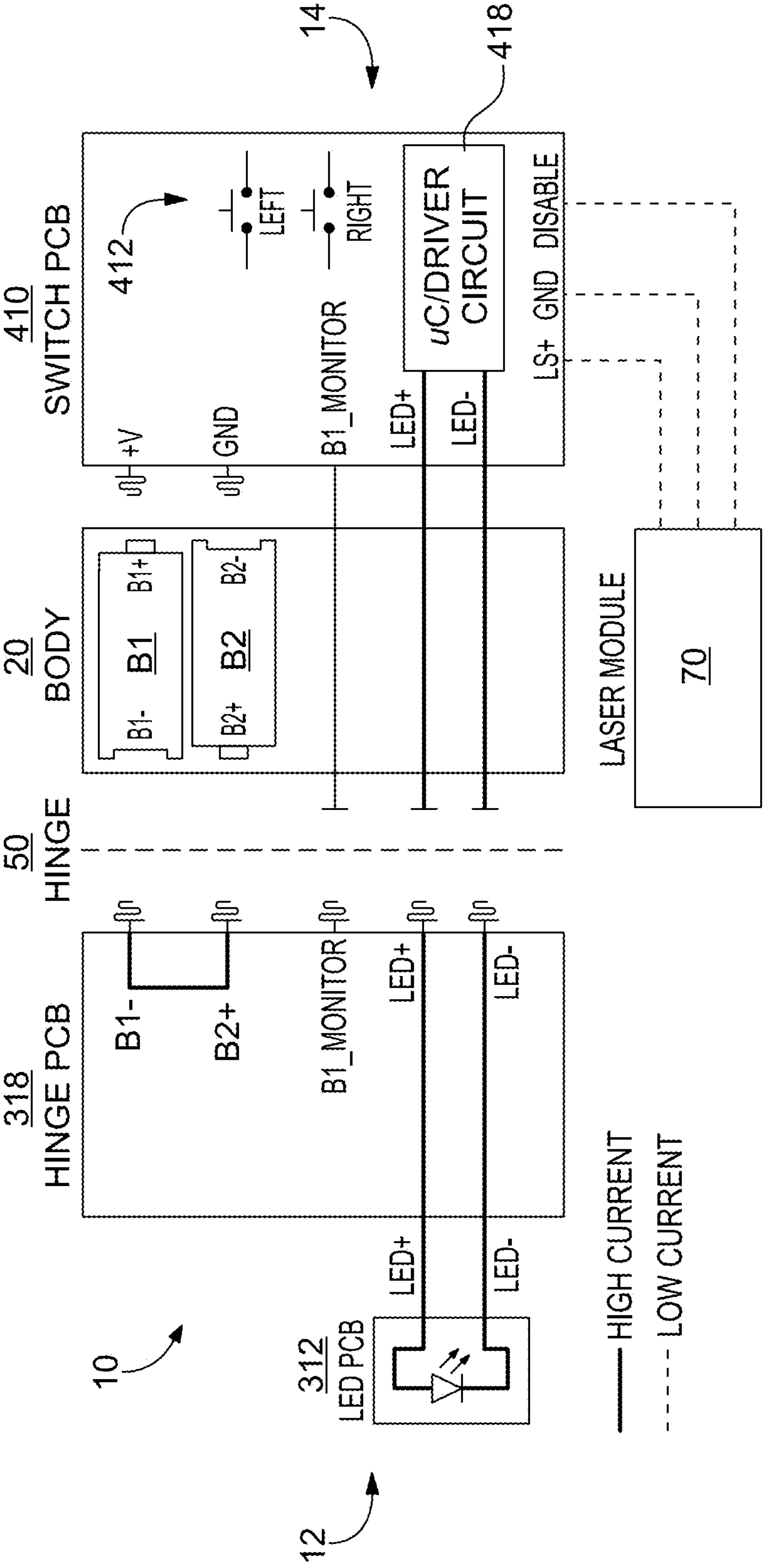

Two alternative arrangements for a light 10, as illustrated in FIGS. 8A and 8B, include an illumination light source 310 at its forward end 12 and actuatable electrical switches 412 at its rearward end 14, and in addition, a laser module 70, as for providing a beam of laser light to assist aiming. In these arrangements, the electronic processor circuit (uC), 319, 418 that controls operation of light 10 may be disposed either on a circuit board 318, e.g., as processor 319, that is disposed in access cover 30 or on a circuit board 410, e.g., as processor 418, that is disposed in rear cover 40. Laser module 70 may be an optional feature of light 10. Different arrangements of the elements of light 10, as well as other considerations, may result in a different number and/or different type of electrical conductors being provided for making connections between electrical circuits of access cover/light head 30 and those of rear cover/tail cap 40.

Figure 8C:
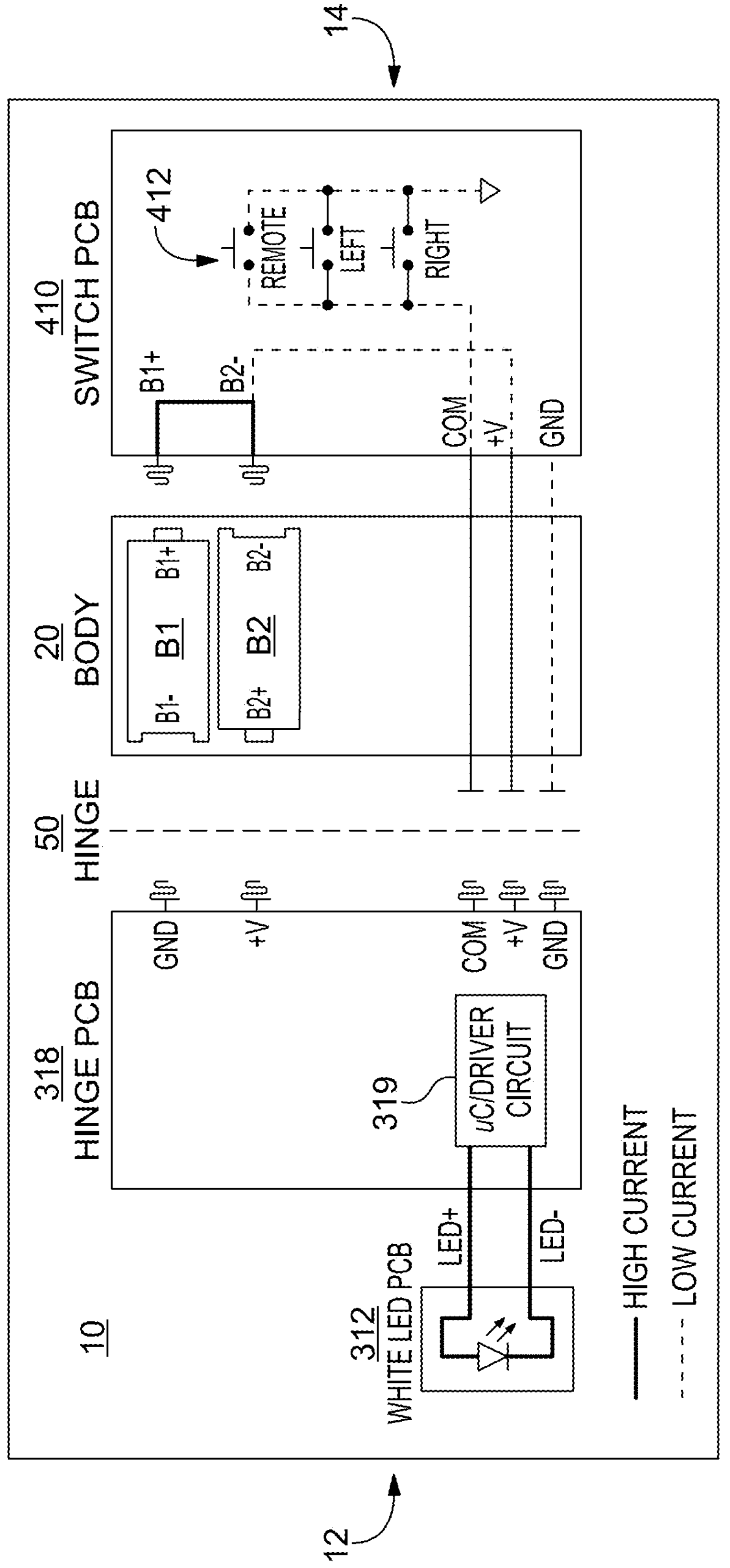

As presently configured, one example light 10, as illustrated by FIG. 8C, has two electrical switches 412 connected in parallel within tail cap 30, e.g., on circuit board 410 thereof, for being actuated by a respective actuator 402 thereof, and so there is no difference in functionality between the left/right side switch actuators 402. The signal from closure and from opening either these parallel-connected electrical switches is conducted to light head assembly 30 through the spring-loaded conductive pins 510 in interconnect housing 500 to a microcontroller 318, e.g., a processor, microprocessor or microcontroller 318, (also labeled "uC" or "μC"), disposed on the "hinge" circuit board 312 of light head 30. Circuit board 312 preferably includes a driver circuit 318, typically controlled by a uC circuit 318, for providing operating voltage and current to light source 310, 314, e.g., typically an LED source of illumination 310, 314, e.g., of "white" illuminating light.

In one embodiment, this signal from switches 412 is a simple ON/OFF type signal that uses two of the three spring-loaded pins 510 located in the interconnect housing 500. The third spring loaded pin 510 can be utilized to send the voltage of one of the batteries forward to the microcontroller 318, e.g., where the microcontroller 318 can be operated from the voltage provided by one of the two batteries in the illustrated example embodiment, e.g., the ~3.5-4 volts from a CR-123 Lithium battery. In the examples illustrated in these Figures, the example source of electrical power illustrated includes two Lithium batteries connected in series, e.g., CR-123 single use Lithium batteries or RCR-123 rechargeable Lithium batteries.

The embodiment of FIG. 8C includes an option of providing a remote switch which is useful when light 10 is employed on an object where the user control, e.g., on a long gun where the trigger, is remote from the rail or other feature onto which a light 10 would be mounted. In that option, tail cap assembly 300 includes a connector to which a cable and connector of a remote switch device may be plugged in; the electrical switch of the remote switch device is, e.g., typically connected in parallel with the switch or switches 412 of tail cap assembly 30, thereby to provide the same functionality.

Figure 8D:
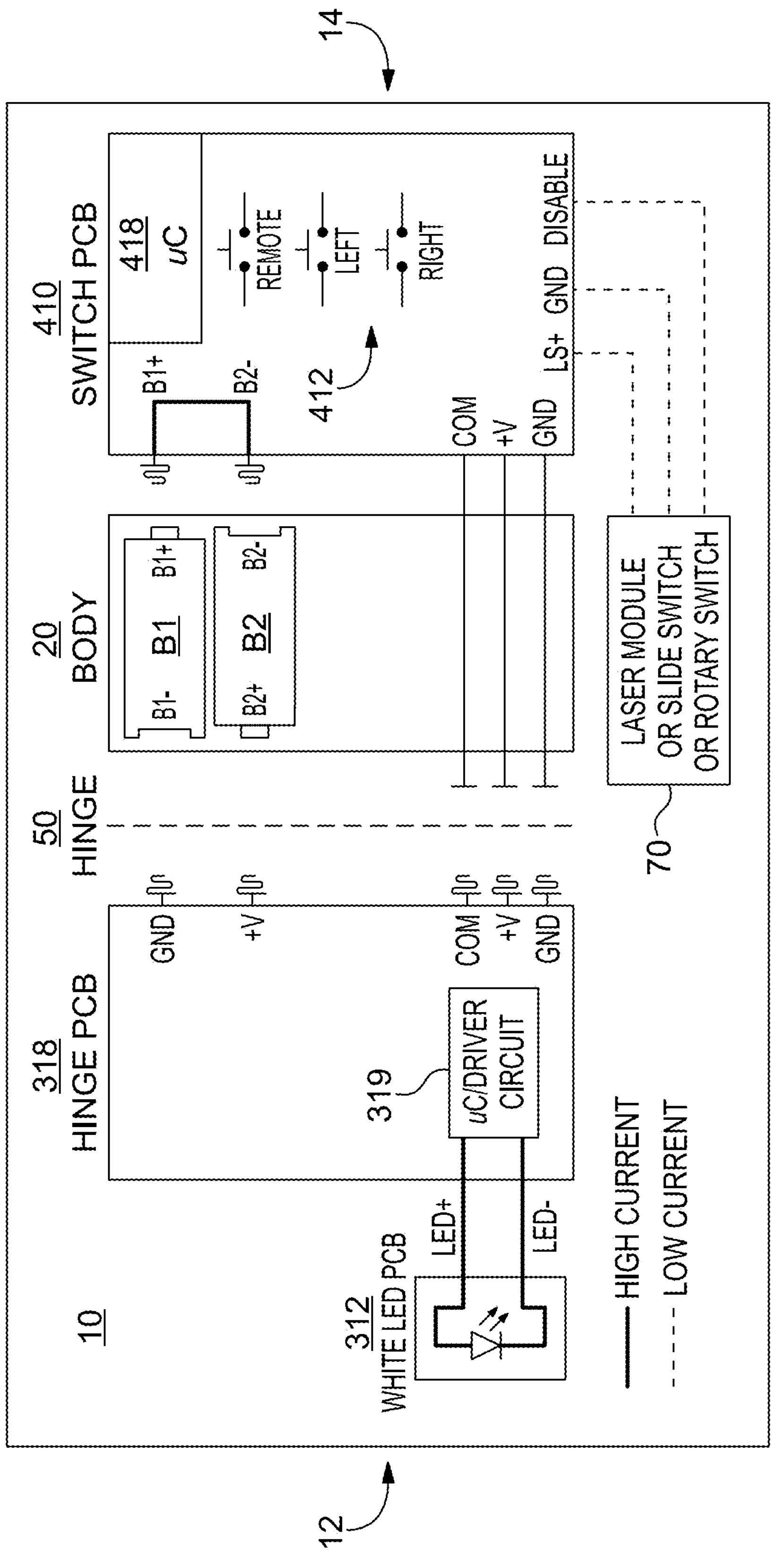

In another example embodiment of light 10 which is configured as in FIG. 8D, light 10 includes a laser module 70, e.g., for providing a beam of laser light for aiming the firearm. Therein tail cap circuit board 410 includes a processor 418, e.g., a processor, microprocessor or micro controller 418, that is responsive to switches 412, as well optionally responsive to an optional remote switch, for operating light source 310 via conductors 510 as previously described, and for additionally operating laser light source 70 to provide an aiming beam of laser light at a user's control. It is noted that processor 418 can be configured to receive different combinations of operations of switches 412 and/or the optional remote switch for configuring light 10 to operate in different operating modes and/or states. The circuit board 310, 312 of the light head assembly 30 and assembly 30, light body 20 as well as electrical carrier 500 and conductive pins 510 therein, can be as previously described.

Figure 8E:
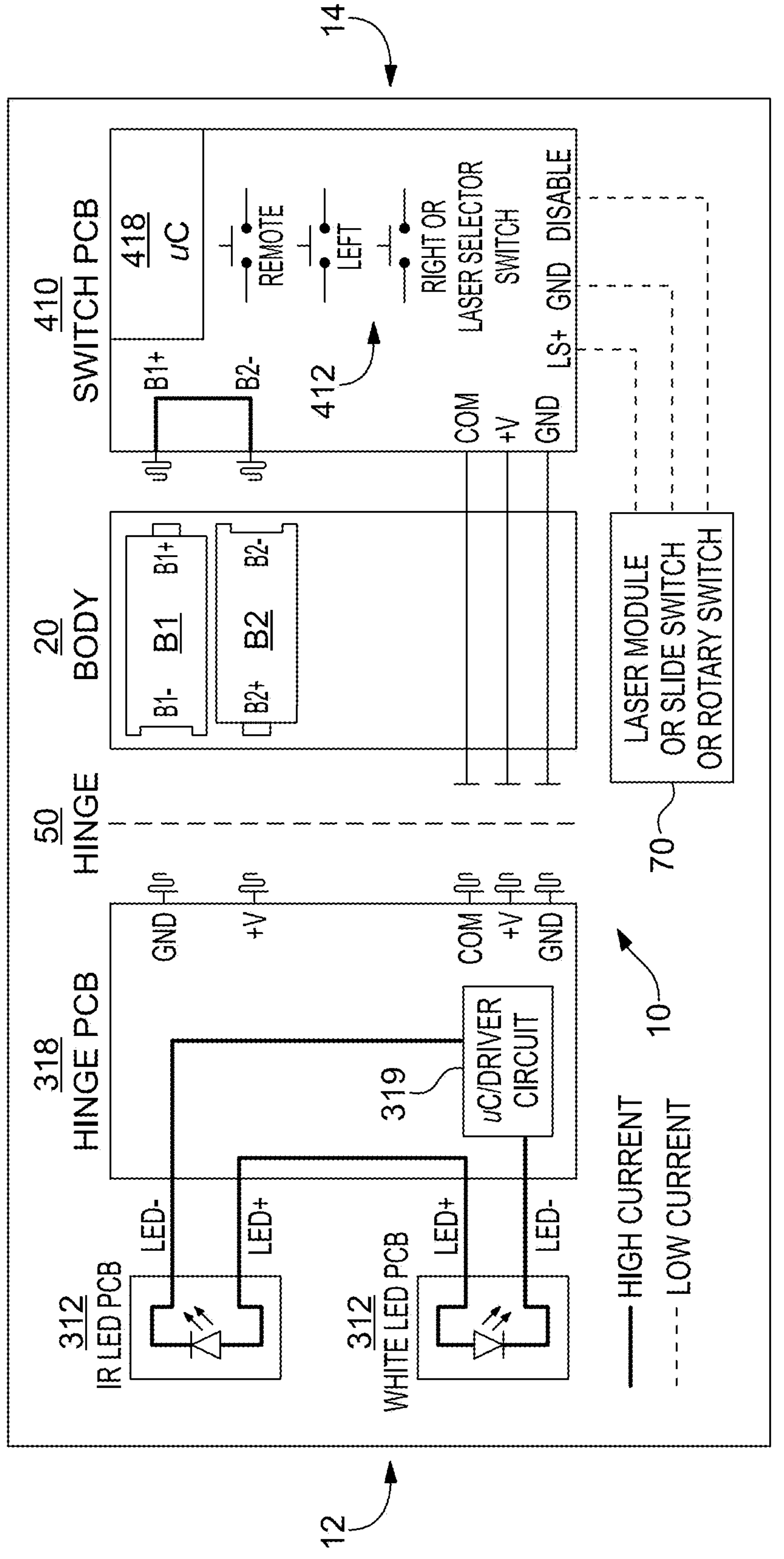

In a further example embodiment of light 10 which is configured as in FIG. 8E, light body 20 and tail cap assembly 40 are as described above, and light head assembly 30 includes a second light source 310, 312, 314 in addition to first light source 310, 312, 314 and the control circuit 319 of circuit board 318 is configured to also drive both the first light source 312 and the additional light source 312. Light body 20 and tail cap 40 can be as previously described. Additional light source 312 may be e.g., another LED light source 314 or another kind of light source, e.g., a colored or an infrared (IR) light source, e.g., LED 314; any light source 310 can be mounted on a suitable circuit board 312 or other supporting structure.

It is noted that a number of different example interconnection 500 arrangements for providing the one or more conductors 510 suitable for light 10 products may be employed. Therein, various suitable arrangements including electrically conductive cables, wires, circuit boards, pins, spring-loaded pins and the like may be employed, different ones of which may be advantageous under different design objectives, e.g., where two illuminators (an IR and a white LED light source) are provided in the face cap assembly 30, where different combinations of lasers and LED light sources are provided, and where different switch arrangements, e.g., a remote switch, one or more slide switches, one or more toggle switches, one or more Hall-effect switches with one or more magnets in one or more movable actuators, are employed.

In a typical embodiment, various parts of light 10, e.g., housings, covers, actuators and the like, may be a nylon, reinforced nylon, engineered nylon, nylon 6, nylon 66, polyamide, polyamide 66, reinforced polyamide, reinforced polyamide 66, acrylonitrile butadiene styrene (ABS), polycarbonate, polyethylene, polypropylene, polycarbonate, polyester-polycarbonate blend, ABS polycarbonate blend, or other suitable plastic material, or of a cast, molded, forged, or machined metal. Resilient and/or flexible parts, such as, e.g., o-rings and seals, may be of any suitable flexible and/or resilient material, e.g., rubber, neoprene rubber, elastomers, thermoplastic elastomers (TPEs), silicones, urethanes, MONOPRENE® rubber, nylon-bondable SANTOPRENE® rubber, HERCUPRENE rubber, NYLABOND® TPE material, AuroraFlex™ TPE material, and other suitable materials.

Metal parts, such as housings, covers, springs and fasteners, may be of any suitable metal, e.g., aluminum, steel, spring steel, metal wires, brass, bronze, phosphor bronze, magnesium, beryllium copper, and the like. Where a part provides heat sinking, e.g., a light head housing, such may include a relatively highly thermally conductive material such as aluminum, brass, copper, magnesium, cast metal, and/or a plastic filled with thermally conductive particles, e.g., a thermally conductive reinforced nylon, engineered nylon, acrylonitrile butadiene styrene (ABS), polycarbonate, polyethylene, polypropylene, polycarbonate, polyester-polycarbonate blend, ABS polycarbonate blend, or other suitable thermally conductive plastic material, e.g., a plastic that includes (is filled with) thermally conductive particles, flakes, strands or other thermally conductive material, as well as other materials having suitable strength and thermal conductivity.

A mountable light may comprise: a light body having a clamping arrangement on a side thereof, having one or more actuators thereon and having a compartment for receiving a source of electrical power, the compartment having an opening at an end of the light body; a light head assembly including a source of light responsive to the one or more actuators, wherein the light head assembly is configured to cover the opening of the compartment of the light body; the light body and the light head assembly each having an engaging feature thereon that engages the engaging feature of the other for pivoting the light head assembly relative to the light body; and a latch for retaining the light head assembly against the light body when the light head assembly is covering the opening of the compartment of the light body. The light head assembly is pivotable for covering and uncovering the opening of the compartment of the light body, whereby a source of electrical power can be placed into and/or removed from the compartment of the light body when the mountable light is mounted to an object by the clamping arrangement. The compartment of the light body may be configured for receiving one or more sources of electrical power therein; and/or the compartment of the light body may be configured for receiving plural sources of electrical power side-by-side therein. The one or more sources of electrical power may include one or more batteries. The engaging features of the light body and of the light head assembly may define a hinge wherein the light head assembly is pivotable away from the light body to uncover the opening of the compartment thereof; and/or the engaging features of the light body and of the light head assembly may remain engaged when the light head assembly is pivoted away from the light body to uncover the opening of the compartment thereof. The latch may include an engaging feature on the light head assembly and a complementary engaging feature on the light body: wherein the engaging features of the light head assembly and of the light body engage when the light head assembly is covering the opening of the compartment of the light body, and wherein the engaging features of the light head assembly and of the light body disengage to release the light head assembly to be pivoted to uncover the opening of the compartment of the light body. The engaging feature of one of the light head assembly and the light body may include a clip attached thereto and the engaging feature of the other of the light head assembly and the light body includes a shaft that is rotatable to engage the clip. The light body includes a body housing defining the shape of the compartment and a tail cap assembly attached to the body housing, wherein the tail cap assembly supports the one or more actuators. The light head assembly may include a first electrical circuit board and the tail cap assembly may include a second electrical circuit board, wherein: the first electrical circuit board includes the source of light; and/or the second electrical circuit board includes one or more electrical switches that are actuatable by the one or more actuators. The mountable light may further comprise one or more processors coupled to the source of light and responsive to one or more electrical switches for causing the source of light to produce light, wherein the light head assembly includes a first electrical circuit board and the light body includes a second electrical circuit board, wherein: the first electrical circuit board includes one of the one or more processors which is responsive to the one or more electrical switches for causing the source of light to produce light; and/or the second electrical circuit board includes one of the one or more processors that is responsive to the one or more electrical switches for causing the source of light to produce light; and wherein the one or more electrical switches are actuatable by the one or more actuators. The source of light of the light head assembly may include a source of white light for illumination, a source of colored light, and/or a source of infrared light. The mountable light may further comprise a source of laser light, wherein the source of laser light is controlled by the one of the one or more processors of the second electrical circuit board. The source of light of the light head assembly may include a source of white light for illumination, a source of colored light, and/or a source of infrared light, and wherein the source of light is actuatable by the one or more actuators. The mountable light may further comprise one or more electrical switches that are actuatable by the one or more actuators, and one or more electrical conductors disposed in the light body for coupling the one or more electrical switches to the source of light and to the source of electrical power. The mountable light may include a carrier housing disposed in the compartment of the light body, wherein the one or more electrical conductors are disposed in the carrier housing. The one or more electrical conductors may include: one or more wires, one or more formed wires, one or more conductive pins, one or more spring-loaded pins, one or more plungers with springs, a cable, a flexible cable, a ribbon cable, an electrical circuit board, or a combination thereof.

A mountable light for mounting to a firearm may comprise: a light body having a clamping arrangement on a side thereof for clamping the mountable light to a firearm, the light body having one or more actuators thereon and having a compartment for receiving one or more batteries, the compartment having an opening at a forward end of the light body; a light head assembly including a source of light responsive to the one or more actuators, wherein the light head assembly is configured to cover the opening of the compartment of the light body at the forward end thereof; the light body and the light head assembly each having a pivot feature thereon that engages the pivot feature of the other for pivoting the light head assembly relative to the light body; and a latch for retaining the light head assembly against the light body when the light head assembly is covering the opening of the compartment of the light body; wherein complementary latching features of the light head assembly and of the light body engage when the light head assembly is covering the opening of the compartment of the light body and disengage to release the light head assembly to be pivoted to uncover the opening of the compartment of the light body. The light head assembly may be pivotable for covering and uncovering the opening of the compartment of the light body, whereby a one or more batteries can be placed into and/or removed from the compartment of the light body when the mountable light is mounted to the firearm by the clamping arrangement. The compartment of the light body may be configured for receiving plural batteries side-by-side therein. The pivot features of the light body and of the light head assembly may define a hinge wherein the light head assembly is pivotable away from the light body to uncover the opening of the compartment thereof; and/or the pivot features of the light body and of the light head assembly may remain engaged when the light head assembly is pivoted away from the light body to uncover the opening of the compartment thereof. The latching feature of one of the light head assembly and the light body may include a clip attached thereto and the latching feature of the other of the light head assembly and the light body may include a shaft that is rotatable to engage the clip. The light body may include a body housing defining the shape of the compartment and a tail cap assembly attached to the body housing, wherein the tail cap assembly supports the one or more actuators. The light head assembly may include a first electrical circuit board and the light body includes a second electrical circuit board, wherein: the first electrical circuit board includes the source of light; and/or the second electrical circuit board includes one or more electrical switches that are actuatable by the one or more actuators. The mountable light may further comprise one or more processors coupled to the source of light and responsive to one or more electrical switches for causing the source of light to produce light, wherein the light head assembly includes a first electrical circuit board and the light body includes a second electrical circuit board, wherein: the first electrical circuit board includes one of the one or more processors which is responsive to the one or more electrical switches for causing the source of light to produce light; and/or the second electrical circuit board includes one of the one or more processors that is responsive to the one or more electrical switches for causing the source of light to produce light; and wherein the one or more electrical switches are actuatable by the one or more actuators. The source of light of the light head assembly may include a source of white light for illumination, a source of colored light, and/or a source of infrared light, and wherein the source of light is actuatable by the one or more actuators. The mountable light may further comprise one or more electrical switches that are actuatable by the one or more actuators, and one or more electrical conductors disposed in the light body for coupling the one or more electrical switches to the source of light and to the one or more batteries. The mountable light may include a carrier housing disposed in the compartment of the light body, wherein the one or more electrical conductors are disposed in the carrier housing. The one or more electrical conductors may include: one or more wires, one or more formed wires, one or more conductive pins, one or more spring-loaded pins, one or more plungers with springs, a cable, a flexible cable, a ribbon cable, an electrical circuit board, or a combination thereof.

As used herein, the terms “about,” “approximate” and/or “approximately” mean that dimensions, sizes, formulations, parameters, shapes and other quantities and characteristics are not and need not be exact, but may be approximate and/or larger or smaller, as desired, reflecting tolerances, conversion factors, rounding off, measurement error and the like, judgment, and other factors known to those of ordinary skill in the art. In general, a dimension, size, formulation, parameter, shape or other quantity or characteristic is “about” or “approximate” or “substantial” or “substantially” whether or not expressly stated to be such. It is noted that embodiments of very different sizes, shapes and dimensions may employ the described arrangements.

Although terms such as “front,” “back,” “rear,” “side,” “end,” “top,” “bottom,” “up,” “down,” “left,” “right,” “upward,” “downward,” “forward,” “backward,” “under” and/or “over,” “vertical,” “horizontal,” and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

As used herein, the term “and/or” encompasses both the conjunctive and the disjunctive cases, so that a phrase in the form “A and/or B” encompasses “A” or “B” or “A and B.” Likewise, a phrase in the form “A, B and/or C” or a phrase in the form “A and/or B and/or C” includes “A,” “B,” “C,” “A and B,” “A and C,” “B and C,” and “A and B and C.” In addition, the term “at least one of” one or more elements is intended to include one of any one of the elements, more than one of any of the elements, and two or more of the elements up to and including all of the elements, and so, e.g., phrases in the form “at least one of A, B and C” include “A,” “B,” “C,” “A and B,” “A and C,” “B and C,” and “A and B and C.”

As used herein, the term “predetermined” means determined in advance or before hand with respect to whatever the term pertains to. The term may be used with respect to a physical object or thing and/or with respect to an intangible thing, e.g., a signal or data, and the like. Examples thereof may include a fixed value, position, condition and/or limit, however, predetermined is not limited to a fixed value, position, condition and/or limit. A predetermined value, position, condition and/or limit may change or otherwise vary over time, over a sequence and/or over a randomized series of values, positions, conditions and/or limits.

As used herein, the term “plurality” means plural, two or greater in number of whatever the term pertains to, i.e. more than one. The term may be used with respect to a physical object or thing and/or with respect to an intangible thing, e.g., a signal or data, and the like. Examples thereof may include a fixed or movable thing, a fixed value, a changeable value, position, condition and/or limit, and the like.

As used herein, the terms "substantial" and "substantially" mean that the thing referred to as being "substantial" or "substantially" is sufficiently similar in form and/or function as to usable in the invention in a manner that is encompassed or suggested by the description and/or claims herein, and/or an equivalent thereof. The terms "substantial" and "substantially" can include and/or can be in addition to the meaning of the terms "about," "approximate" and/or "approximately" herein.

A fastener as used herein may include any fastener or other fastening device that may be suitable for the described use, including threaded fasteners, e.g., bolts, screws and driven fasteners, as well as pins, rivets, nails, spikes, barbed fasteners, clips, clamps, nuts, speed nuts, cap nuts, acorn nuts, and the like. Where it is apparent that a fastener would be removable in the usual use of the example embodiment described herein, then removable fasteners would be preferred in such instances. A fastener may also include, where appropriate, other forms of fastening such as a formed head, e.g., a peened or heat formed head, a weld, e.g., a heat weld or ultrasonic weld, a braze, an adhesive, a clasp, a clip, a latch, and the like.

As used herein, the terms "connected" and "coupled" as well as variations thereof may or may not be intended to be exact synonyms, but may also encompass some similar things and some different things, and those terms are used interchangeably herein. While the term "connected" as indicated by its context may be used generally to refer to elements that have a direct electrical and/or physical contact to each other, whereas the term "coupled" as indicated by its context may be used generally to refer to elements that have an indirect electrical and/or indirect physical contact with each other, e.g., via one or more intermediate elements, so as to cooperate and/or interact with each other, and may include elements in direct contact as well.

The term "battery" may be used herein to refer generally to a source of electrical power as well as to an electro-chemical device comprising one or more electro-chemical cells and/or fuel cells, and so a battery may include a single cell or plural cells, whether as individual units or as a packaged unit. A battery is one example of a type of an electrical power source suitable for a portable or other device. Such devices could employ power sources including, but not limited to, fuel cells, super capacitors, solar cells, and the like, as well as an electro-chemical battery. Any of the foregoing may be intended for a single use or for being rechargeable or for both, and/or plural ones thereof may be combined into a battery pack or battery assembly or other such assembly or pack, and any, some or all thereof may be referred to herein under the general term battery.

While the present invention has been described in terms of the foregoing example embodiments, variations within the scope and spirit of the present invention as defined by the claims following will be apparent to those skilled in the art. For example, light 10 includes an access cover 30 that also includes one or more light sources and so serves as a light head assembly 30 as well as a cover. Access cover 30 may be attached to light body 20 by different configurations of a suitable pivot arrangement 50 between light body 20 and access cover 30/light head assembly 30. E.g., pivot 50 may be a ball and socket arrangement, a ball in slot arrangement, a loop and hook arrangement, a hinge arrangement, or any other suitable arrangement.

Pivot arrangement 50 may be one in which access cover 30 remains connected to light body 20 when it is opened relative to light 10, or it may be one in which access cover 30 can be disconnected from light body 20 when it is opened, however, the former is preferred because it helps to avoid situations where an access cover 30 can be misplaced or lost.

Similarly, latch arrangement 60 may be of various different suitable arrangements 60, including e.g., a ball that snaps into a split clip, a movable loop and post, a pawl and lever, a snap, or any other suitable latching arrangement. The releasing feature of the latch may also be of various types and kinds, including, e.g., ones that simply release when an access cover 30 is attempted to be physically moved away from a light body 20 and/or ones that require a positive action on the part of a user, including the example release lever described herein, one or more buttons that when pushed release the latch, and the like. The present arrangement includes latches and releases that may be on the access cover 30 and/or on light body 20 and/or on both.

Further, light 10 may be configured such that more detailed left/right switch information can communicated via the same pins 510 or one or more other electrical conductors 510 to select different LEDs and/or lasers that are included in face cap 30, e.g., the information being encoded by signals on different ones of pins 510 and/or thereon at different times, and the like, e.g., by a processor. In one alternative, light housing 200 may be of an electrically conductive material and may provide an electrical conductor between access cover 30 and rear cover 40.

Mounting arrangement 50 of light 10 may be of any type or configuration that is suitable for mounting light 10 to a use object, including but not limited to a firearm. Similarly, the one or more actuators 402 may be of the example type described herein or of any other suitable type and kind.

Examples of suitable mounting arrangements include, e.g., the mounting arrangements described in U.S. Pat. No. 7,188,978 entitled "LIGHT MOUNTABLE ON A MOUNTING RAIL," U.S. Pat. No. 8,371,729 entitled "LIGHT WITH KEYING ARRANGEMENT MOUNTABLE ON A MOUNTING RAIL," and U.S. Pat. No. 11,506,366 entitled "MOUNTABLE LIGHT HAVING INTERCHANGEABLE CLAMPING ELEMENTS."

While certain features may be described as a raised feature, e.g., a ridge, boss, flange, projection, detent, or other raised feature, such feature may be positively formed or may be what remains after a recessed feature, e.g., a groove, slot, hole, indentation, recess, detent, or other recessed feature, is made. Similarly, while certain features may be described as a recessed feature, e.g., a groove, slot, hole, indentation, recess or other recessed feature, such feature may be positively formed or may be what remains after a raised feature, e.g., a ridge, boss, flange, projection or other raised feature, is made. In addition, where a raised feature engages a recessed feature, such as a cylindrical projection that engages a complementary receptacle, the relative positions of the raised and recessed features may be interchanged or other wise modified.

Each of the U.S. Provisional Applications, U.S. Patent Applications, and/or U.S. Patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A mountable light comprises:

a light body having a clamping arrangement on a side thereof for clamping the mountable light to an object, having one or more actuators thereon and having a compartment for receiving a source of electrical power, the compartment having an opening at an end of the light body;

a light head assembly including a source of light responsive to the one or more actuators, wherein the light head assembly is configured to cover the opening of the compartment of the light body;

the light body and the light head assembly each having an engaging feature thereon that engages the engaging feature of the other for pivoting the light head assembly relative to the light body away from the clamping arrangement, whereby the light head assembly is pivotable for uncovering and covering the opening of the compartment of the light body when the mountable light is mounted to the object; and a latch for retaining the light head assembly against the light body when the light head assembly is covering the opening of the compartment of the light body;

whereby a source of electrical power can be placed into and/or removed from the compartment of the light body when the mountable light is mounted to an object by the clamping arrangement.

2. The mountable light of claim 1 wherein:

the compartment of the light body is configured for receiving one or more sources of electrical power therein; and/or the compartment of the light body is configured for receiving plural sources of electrical power side-by-side therein.

3. The mountable light of claim 2 wherein the one or more sources of electrical power include one or more batteries.

4. The mountable light of claim 1 wherein:

the engaging features of the light body and of the light head assembly define a hinge wherein the light head assembly is pivotable away from the light body to uncover the opening of the compartment thereof; and/or the engaging features of the light body and of the light head assembly remain engaged when the light head assembly is pivoted away from the light body to uncover the opening of the compartment thereof.

5. The mountable light of claim 1 wherein the latch includes an engaging feature on the light head assembly and a complementary engaging feature on the light body:

wherein the engaging features of the light head assembly and of the light body engage when the light head assembly is covering the opening of the compartment of the light body, and wherein the engaging features of the light head assembly and of the light body disengage to release the light head assembly to be pivoted to uncover the opening of the compartment of the light body.

6. The mountable light of claim 5 wherein the engaging feature of one of the light head assembly and the light body includes a clip attached thereto and the engaging feature of the other of the light head assembly and the light body includes a shaft that is rotatable to engage the clip.

7. The mountable light of claim 1 wherein the light body includes a body housing defining the shape of the compartment and a tail cap assembly attached to the body housing, wherein the tail cap assembly supports the one or more actuators.

8. The mountable light of claim 7 wherein the light head assembly includes a first electrical circuit board and the tail cap assembly includes a second electrical circuit board, wherein:

the first electrical circuit board includes the source of light; and/or the second electrical circuit board includes one or more electrical switches that are actuatable by the one or more actuators.

9. The mountable light of claim 1 further comprising one or more processors coupled to the source of light and responsive to one or more electrical switches for causing the source of light to produce light, wherein the light head assembly includes a first electrical circuit board and the light body includes a second electrical circuit board, wherein:

the first electrical circuit board includes one of the one or more processors which is responsive to the one or more electrical switches for causing the source of light to produce light; and/or the second electrical circuit board includes one of the one or more processors that is responsive to the one or more electrical switches for causing the source of light to produce light; and wherein the one or more electrical switches are actuatable by the one or more actuators.

10. The mountable light of claim 9 wherein the source of light of the light head assembly includes a source of white light for illumination, a source of colored light, and/or a source of infrared light.

11. The mountable light of claim 9 further comprising a source of laser light, wherein the source of laser light is controlled by the one of the one or more processors of the second electrical circuit board.

12. The mountable light of claim 1 wherein the source of light of the light head assembly includes a source of white light for illumination, a source of colored light, and/or a source of infrared light, and wherein the source of light is actuatable by the one or more actuators.

13. The mountable light of claim 1 further comprising one or more electrical switches that are actuatable by the one or more actuators, and one or more electrical conductors disposed in the light body for coupling the one or more electrical switches to the source of light and to the source of electrical power.

14. The mountable light of claim 13 including a carrier housing disposed in the compartment of the light body, wherein the one or more electrical conductors are disposed in the carrier housing.

15. The mountable light of claim 13 wherein the one or more electrical conductors include: one or more wires, one or more formed wires, one or more conductive pins, one or more spring-loaded pins, one or more plungers with springs, a cable, a flexible cable, a ribbon cable, an electrical circuit board, or a combination thereof.

16. A mountable light for mounting to a firearm comprises:

a light body having a clamping arrangement on a side thereof for clamping the mountable light to a firearm, the light body having one or more actuators thereon and having a compartment for receiving one or more batteries, the compartment having an opening at a forward end of the light body;

a light head assembly including a source of light responsive to the one or more actuators, wherein the light head assembly is configured to cover the opening of the compartment of the light body at the forward end thereof;

the light body and the light head assembly each having a pivot feature thereon that engages the pivot feature of the other for pivoting the light head assembly relative to the light body away from the clamping arrangement, whereby the light head assembly is pivotable for uncovering and for covering the opening of the compartment of the light body when the mountable light is mounted to a firearm; and a latch for retaining the light head assembly against the light body when the light head assembly is covering the opening of the compartment of the light body;

wherein complementary latching features of the light head assembly and of the light body engage when the light head assembly is covering the opening of the compartment of the light body and disengage to release the light head assembly to be pivoted to uncover the opening of the compartment of the light body;

whereby a one or more batteries can be placed into and/or removed from the compartment of the light body when the mountable light is mounted to the firearm by the clamping arrangement.

17. The mountable light of claim 16 wherein: the compartment of the light body is configured for receiving plural batteries side-by-side therein.

18. The mountable light of claim 16 wherein:

the pivot features of the light body and of the light head assembly define a hinge wherein the light head assembly is pivotable away from the light body to uncover the opening of the compartment thereof; and/or the pivot features of the light body and of the light head assembly remain engaged when the light head assembly is pivoted away from the light body to uncover the opening of the compartment thereof.

19. The mountable light of claim 16 wherein the latching feature of one of the light head assembly and the light body includes a clip attached thereto and the latching feature of the other of the light head assembly and the light body includes a shaft that is rotatable to engage the clip.

20. The mountable light of claim 16 wherein the light body includes a body housing defining the shape of the compartment and a tail cap assembly attached to the body housing, wherein the tail cap assembly supports the one or more actuators.

21. The mountable light of claim 16 wherein the light head assembly includes a first electrical circuit board and the light body includes a second electrical circuit board, wherein:

the first electrical circuit board includes the source of light; and/or the second electrical circuit board includes one or more electrical switches that are actuatable by the one or more actuators.

22. The mountable light of claim 16 further comprising one or more processors coupled to the source of light and responsive to one or more electrical switches for causing the source of light to produce light, wherein the light head assembly includes a first electrical circuit board and the light body includes a second electrical circuit board, wherein:

the first electrical circuit board includes one of the one or more processors which is responsive to the one or more electrical switches for causing the source of light to produce light; and/or the second electrical circuit board includes one of the one or more processors that is responsive to the one or more electrical switches for causing the source of light to produce light; and wherein the one or more electrical switches are actuatable by the one or more actuators.

23. The mountable light of claim 16 wherein the source of light of the light head assembly includes a source of white light for illumination, a source of colored light, and/or a source of infrared light, and wherein the source of light is actuatable by the one or more actuators.

24. The mountable light of claim 16 further comprising one or more electrical switches that are actuatable by the one or more actuators, and one or more electrical conductors disposed in the light body for coupling the one or more electrical switches to the source of light and to the one or more batteries.

25. The mountable light of claim 24 including a carrier housing disposed in the compartment of the light body, wherein the one or more electrical conductors are disposed in the carrier housing.

26. The mountable light of claim 24 wherein the one or more electrical conductors include: one or more wires, one or more formed wires, one or more conductive pins, one or more spring-loaded pins, one or more plungers with springs, a cable, a flexible cable, a ribbon cable, an electrical circuit board, or a combination thereof.

27. The mountable light of claim 1 wherein the clamping arrangement includes a clamp screw.

28. The mountable light of claim 16 wherein the clamping arrangement includes a clamp screw.

* * * * *